US010760762B2

(12) United States Patent
Nykerk et al.

(10) Patent No.: US 10,760,762 B2
(45) Date of Patent: Sep. 1, 2020

(54) LIT IMAGE PROJECTION LAMP AND ASSEMBLIES AND METHODS TO USE THE SAME TO GENERATE THREE-DIMENSIONAL IMAGES

(71) Applicant: Flex-N-Gate Advanced Product Development, LLC, Tecumseh (CA)

(72) Inventors: Todd M. Nykerk, Holland, MI (US); Lester R. Sullivan, Wyoming, MI (US)

(73) Assignee: Flex-N-Gate Advanced Product Development, LLC, Tecumseh, Ontario (CA)

( * ) Notice: Subject to any disclaimer, the term of this patent is extended or adjusted under 35 U.S.C. 154(b) by 350 days.

(21) Appl. No.: 15/644,406

(22) Filed: Jul. 7, 2017

(65) Prior Publication Data

US 2017/0314759 A1 Nov. 2, 2017

Related U.S. Application Data

(63) Continuation-in-part of application No. 15/542,331, filed as application No. PCT/US2016/033665 on May 20, 2016, now Pat. No. 10,578,272.

(Continued)

(51) Int. Cl.

| | |
|---|---|
| ***G02B 26/08*** | (2006.01) |
| ***F21S 43/14*** | (2018.01) |
| ***F21S 43/20*** | (2018.01) |
| ***F21S 43/15*** | (2018.01) |
| *F21Y 115/10* | (2016.01) |

(52) U.S. Cl.

CPC ............... *F21S 43/14* (2018.01); *F21S 43/15* (2018.01); *F21S 43/26* (2018.01); *F21Y 2115/10* (2016.08)

(58) Field of Classification Search

CPC .. G03B 35/20; G02B 27/225; G02B 27/2214; H04N 13/32; H04N 13/305; F21V 7/005; F21V 5/004

See application file for complete search history.

(56) References Cited

U.S. PATENT DOCUMENTS

| | | | |
|---|---|---|---|
| 2,550,350 | A | 4/1951 | Henson |
| 5,070,432 | A | 12/1991 | Kitazumi et al. |

(Continued)

OTHER PUBLICATIONS

Johnson et al. Advances in Lenticular Lens Arrays for Visual Display. SPIE. Aug. 2005. [Retrieved Jul. 22, 2016'. Retrieved from internet: ,URL:https://www.researchgate.net/publication/237674438_Advances_inienticular_lens_arrays_for_visual_display_Invited_Paper> pp. 1-12.

(Continued)

*Primary Examiner* — Andrew J Coughlin

(74) *Attorney, Agent, or Firm* — Reichel Stohry Dean LLP; Mark C. Reichel; Natalie J. Dean

(57) ABSTRACT

Lit image projection lamp and assemblies and methods to use the same to generate three-dimensional images. In an exemplary embodiment of a projection device of the present disclosure, the projection device comprises a light source and a curved lens positioned at a first distance from the light source, wherein the curved lens is a lenticular lens, having a concave portion and a convex portion, and wherein the projection device is configured to generate a homogenous light bar image from light emitted from the light source that passes through the curved lens.

13 Claims, 28 Drawing Sheets

Related U.S. Application Data

(60) Provisional application No. 62/398,602, filed on Sep. 23, 2016, provisional application No. 62/359,268, filed on Jul. 7, 2016, provisional application No. 62/181,545, filed on Jun. 18, 2015, provisional application No. 62/165,785, filed on May 22, 2015.

(56) References Cited

U.S. PATENT DOCUMENTS

| | | | | | |
|---|---|---|---|---|---|
| 6,481,849 | B2 | 11/2002 | Martin et al. | | |
| 8,632,189 | B2 | 1/2014 | Read et al. | | |
| 8,870,380 | B2 | 10/2014 | Huang | | |
| 2005/0007664 | A1 | 1/2005 | Harris et al. | | |
| 2005/0180133 | A1* | 8/2005 | Feldstein | B66B 23/225 | 362/219 |
| 2005/0281023 | A1* | 12/2005 | Gould | F21S 8/04 | 362/217.05 |
| 2007/0081131 | A1 | 4/2007 | Van Der Palen et al. | | |
| 2008/0156876 | A1* | 7/2008 | Vinogradov | G06K 7/10732 | 235/462.01 |
| 2010/0246104 | A1* | 9/2010 | Park | H05K 5/02 | 361/679.01 |
| 2012/0113996 | A1* | 5/2012 | Capolla | G02B 19/0057 | 372/22 |
| 2013/0113927 | A1* | 5/2013 | De Bruijn | G01B 11/026 | 348/136 |
| 2015/0323152 | A1* | 11/2015 | Mayer | G03B 15/02 | 362/235 |

OTHER PUBLICATIONS

International Searching Authority, International Search Report, PCT/US2016/033665, dated Oct. 17, 2016.

International Searching Authority, Written Opinion of the International Searching Authority, PCT/US2016/033665, dated Oct. 17, 2016.

* cited by examiner

LIT IMAGE PROJECTION LAMP AND ASSEMBLIES AND METHODS TO USE THE SAME TO GENERATE THREE-DIMENSIONAL IMAGES

PRIORITY

The present application is related to, claims the priority benefit of, and is a U.S. continuation-in-part patent application of, U.S. Nonprovisional patent application Ser. No. 15/542,331, filed Jul. 7, 2017, which is related to, claims the priority benefit of, and is a U.S. § 371 national stage patent application of, PCT Patent Application Serial No. PCT/US2016/033665, filed May 20, 2016, which is related to, and claims the priority benefit of, U.S. Provisional Patent Application Ser. No. 62/165,785 filed May 22, 2015, and U.S. Provisional Patent Application Ser. No. 62/181,545, filed Jun. 18, 2015. The present application is also related to, and also claims the priority benefit of, U.S. Provisional Patent Application Ser. No. 62/359,268, filed Jul. 7, 2016, and U.S. Provisional Patent Application Ser. No. 62/398,602, filed Sep. 23, 2016. The contents of each of the aforementioned patent applications are incorporated directly and also by reference in their entirety into this disclosure.

BACKGROUND

The design of the exterior lighting components of automobiles plays an important role in the styling and marketing of vehicles in the automotive market. Vehicle designers are interested in technologies that can both provide the required regulatory functions of automotive exterior lighting and enable a unique and aesthetically pleasing lit and unlit appearance of the lighting components on the vehicle. There is also a desire to create uniformity and continuity in the lit appearance of functionally separate lamps that may be in close proximity to one another, for instance, a corner tail lamp relative to an applique or lift gate lamps. Therefore, there remains a significant need for the apparatuses, methods, and systems disclosed herein

BRIEF SUMMARY

According to one aspect of the present disclosure, a projection device includes one, two, three, four, or more lenticular lenses positioned in front of a light source to generate a three-dimensional image of the light source between the two lenses when lit. The size, shape, and appearance of the image may be altered by the distances between and orientation of the lenses, characteristics of the lenticular lenses, and characteristics of the light source. The appearance of the lit image is further affected by the angle of observation to the projection device. Various projection devices of the present disclosure may be incorporated into a lamp assembly to provide a unique and shifting lit appearance.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

In an exemplary embodiment of a projection device of the present disclosure, the projection device comprises a light source; a first lens positioned at a first distance from the light source; and a second lens at a second distance from the first lens; wherein the first lens and the second lens are lenticular lenses, each having an optical axis; and wherein the projection device is configured to generate a three-dimensional image from light emitted from the light source that passes through the first lens and the second lens. In at least one embodiment, the light source comprises one or more light-emitting diodes. In at least one embodiment, the light source is a light pipe. In at least one embodiment, the first lens is orthogonal or parallel to an axis of the light source. In at least one embodiment, the first lens and the second lens have an optical density of between 20 and 150 flutes per inch. In at least one embodiment, the optical axis of the first lens is rotated relative to the optical axis of the second lens. In at least one embodiment, the optical axis of the first lens is tilted relative to the optical axis of the second lens. In at least one embodiment, the optical axis of the first lens is tilted relative to the light source. In at least one embodiment, the three-dimensional image is projected as an image selected from the group consisting of an image of a ribbon, an image of a series of twisting lines, an image of fire, an image of shark teeth, an image of diamonds, an image of curved lines, an image of stars, an image of squares, an image of a waterfall, and an image of arcs and a waterfall. In at least one embodiment, the three-dimensional image is projected as an image having a shape selected from the group consisting of a twisted shape, a curved and pointed shape, a fringed leaf shape, a curved triangle shape, a square shape, an amorphous shape, a cube shape, and a diamond shape. In at least one embodiment, the three-dimensional image is projected as an image having a first color and a second color different from the first color. In at least one embodiment, three-dimensional image is projected as an image having a first color, a second color, and a third color, where each of the first color, the second color, and the third color are different from one another. In at least one embodiment, device is further configured to generate a second three-dimensional image from light emitted from the light source that passes through the first lens and the second lens, wherein the three-dimensional image is different from the second three-dimensional image. In at least one embodiment, the device forms part of a lamp assembly, the lamp assembly further comprising a housing and an outer lens, wherein the device is positioned within the housing. In at least one embodiment, the three-dimensional image is present or perceived within the housing between the second lens and the outer lens. In at least one embodiment, the lamp assembly is configured as a vehicle lamp assembly. In at least one embodiment, the lamp assembly further comprises a third lens positioned a third distance from the second lens, wherein the projection device is configured to generate the three-dimensional image from light emitted from the light source that passes through the first lens, the second lens, and the third lens.

In an exemplary embodiment of a lamp assembly of the present disclosure, the lamp assembly comprises a projection device of the present disclosure, such as a projection device comprising a light source, a first lens positioned at a first distance from the light source, and a second lens at a second distance from the first lens, wherein the first lens and the second lens are lenticular lenses, each having an optical axis; a housing; and an outer lens coupled to the housing to define a volume, wherein the projection device is positioned within the volume; wherein the projection device is configured to generate a three-dimensional image within the volume from light emitted from the light source that passes through the first lens and the second lens.

In an exemplary embodiment of a projection device of the present disclosure, the projection device comprises a light source; a first lens positioned at a first distance from the light source; and a blocker plate positioned a second distance from the first lens, the blocker plate defining an aperture therethrough; wherein the first lens is a lenticular lens having an optical axis; and wherein the projection device is configured to generate a three-dimensional image from light emitted from the light source that passes through the first lens and through the aperture of the blocker plate. In at least one embodiment, the light source comprises one or more light-emitting diodes. In at least one embodiment, the light source is a light pipe. In at least one embodiment, the first lens has an optical density of between 20 and 150 flutes per inch. In at least one embodiment, the three-dimensional image is projected as an image having a first color and a second color different from the first color. In at least one embodiment, device is further configured to generate a second three-dimensional image from light emitted from the light source that passes through the first lens and the second lens, wherein the three-dimensional image is different from the second three-dimensional image. In at least one embodiment, the device forms part of a lamp assembly, the lamp assembly further comprising a housing and an outer lens, wherein the device is positioned within the housing, and wherein the three-dimensional image is present or perceived within the housing between the second lens and the outer lens.

In an exemplary embodiment of a lamp assembly of the present disclosure, the lamp assembly comprises a projection device of the present disclosure, such as a projection device comprising a light source, a first lens positioned at a first distance from the light source, and a blocker plate positioned a second distance from the first lens, the blocker plate defining an aperture therethrough; wherein the first lens is a lenticular lens having an optical axis; a housing; and an outer lens coupled to the housing to define a volume, wherein the projection device is positioned within the volume; and wherein the projection device is configured to generate a three-dimensional image from light emitted from the light source that passes through the first lens and through the aperture of the blocker plate.

In an exemplary embodiment of a projection device of the present disclosure, the projection device comprises a light source; and a curved lens positioned at a first distance from the light source; wherein the curved lens is a lenticular lens, having a concave portion and a convex portion; and wherein the projection device is configured to generate a homogenous light bar image from light emitted from the light source that passes through the curved lens. In an exemplary embodiment of a projection device of the present disclosure, the light source comprises one or more light-emitting diodes. In an exemplary embodiment of a projection device of the present disclosure, the curved lens has an optical density of between 20 and 150 flutes per inch. In an exemplary embodiment of a projection device of the present disclosure, the projection device forms part of a lamp assembly, the lamp assembly further comprises a housing and an outer lens, wherein the projection device is positioned within the housing. In an exemplary embodiment of a projection device of the present disclosure, the lamp assembly is configured as a vehicle lamp assembly.

In an exemplary embodiment of a lamp assembly of the present disclosure, the lamp assembly comprises a projection device comprising a light source; and a curved lens positioned at a first distance from the light source; wherein the curved lens is a lenticular lens, having a concave portion and a convex portion; a housing; and an outer lens coupled to the housing to define a volume, wherein the projection device is positioned within the volume; wherein the projection device is configured to generate a homogenous light bar image from light emitted from the light source that passes through the curved lens.

In an exemplary embodiment of a projection device of the present disclosure, the projection device comprises a light source; an opaque mask having one or more custom apertures defined therethrough, each of the one or more custom apertures having a size and a shape; at least one first lens element and at least one second lens element; and a lenticular lens/sheet; wherein the projection device is configured to generate one or more three dimensional images corresponding to the one or more custom apertures of the opaque mask by emitting light from the light source and through the one or more custom apertures of the opaque mask, the at least one first lens element, the at least one second lens element, and the lenticular lens/sheet.

In an exemplary embodiment of a projection device of the present disclosure, the light source comprises one or more light-emitting diodes.

In an exemplary embodiment of a projection device of the present disclosure, the at least one first lens element comprises at least one first custom lenticular shaped portion, and wherein the at least one second lens element comprises at least one second custom lenticular shaped portion.

In an exemplary embodiment of a projection device of the present disclosure, the at least one first custom lenticular shaped portion and the at least one second custom lenticular shaped portion have a size and a shape corresponding to the size and the shape of the one or more custom apertures.

In an exemplary embodiment of a projection device of the present disclosure, the at least one first lens element comprises at least one additional lenticular lens/sheet, and wherein the at least one second lens element comprises at least one further lenticular lens/sheet.

In an exemplary embodiment of a projection device of the present disclosure, the projection device forms part of a lamp assembly, the lamp assembly further comprising a housing and an outer lens, wherein the projection device is positioned within the housing.

In an exemplary embodiment of a projection device of the present disclosure, the lamp assembly is configured as a vehicle lamp assembly.

In an exemplary embodiment of a projection device of the present disclosure, the projection device comprises a light source; a first lenticular lens/sheet; a second lenticular lens/sheet positioned distal to the first lenticular lens/sheet relative to the light source, the second lenticular lens/sheet having a negative image mask thereon or defined therein, the negative image mask having one or more opaque portions defining one or more open portions; and a third lenticular lens/sheet positioned distal to the second lenticular lens/sheet; wherein the projection device is configured to generate one or more three dimensional images corresponding to the one or more open portions of the opaque mask by emitting light from the light source and through the first lenticular lens/sheet, the opaque mask of the second lenticular lens/sheet, and the third lenticular lens/sheet.

In an exemplary embodiment of a projection device of the present disclosure, the light source comprises one or more light-emitting diodes.

In an exemplary embodiment of a projection device of the present disclosure, the projection device forms part of a lamp assembly, the lamp assembly further comprising a housing and an outer lens, wherein the projection device is positioned within the housing.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1A:
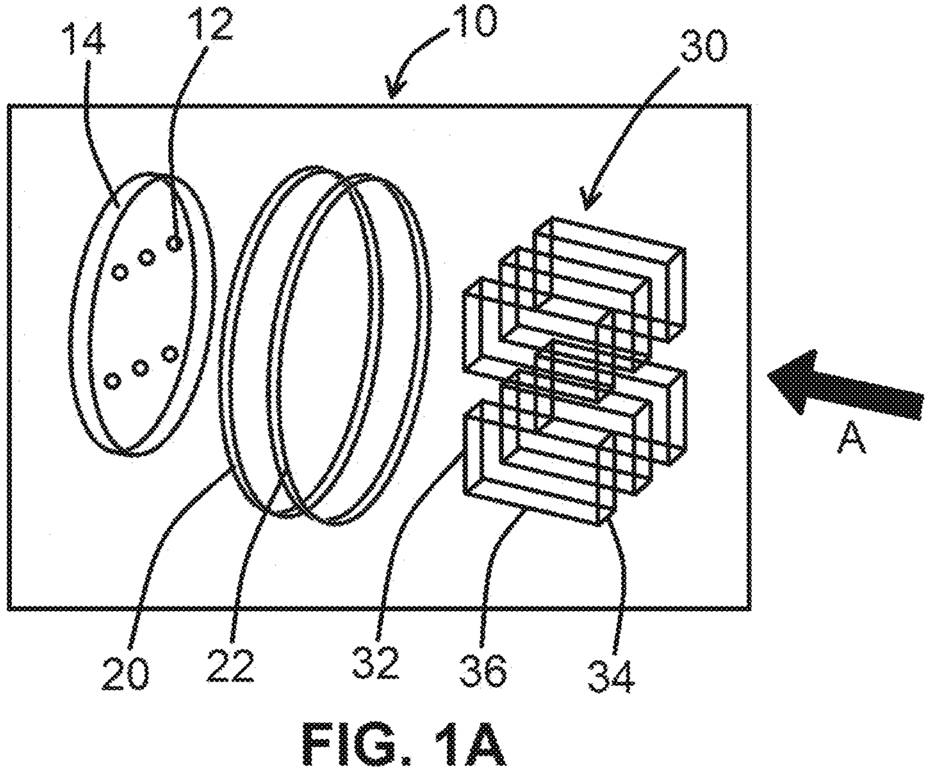
FIGS. 1A-1F show isometric views of embodiments of projection devices according to the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

The present application discloses various embodiments of a projection device and methods for using and constructing the same. According to one aspect of the present disclosure, a lamp assembly having a projection device. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1B:
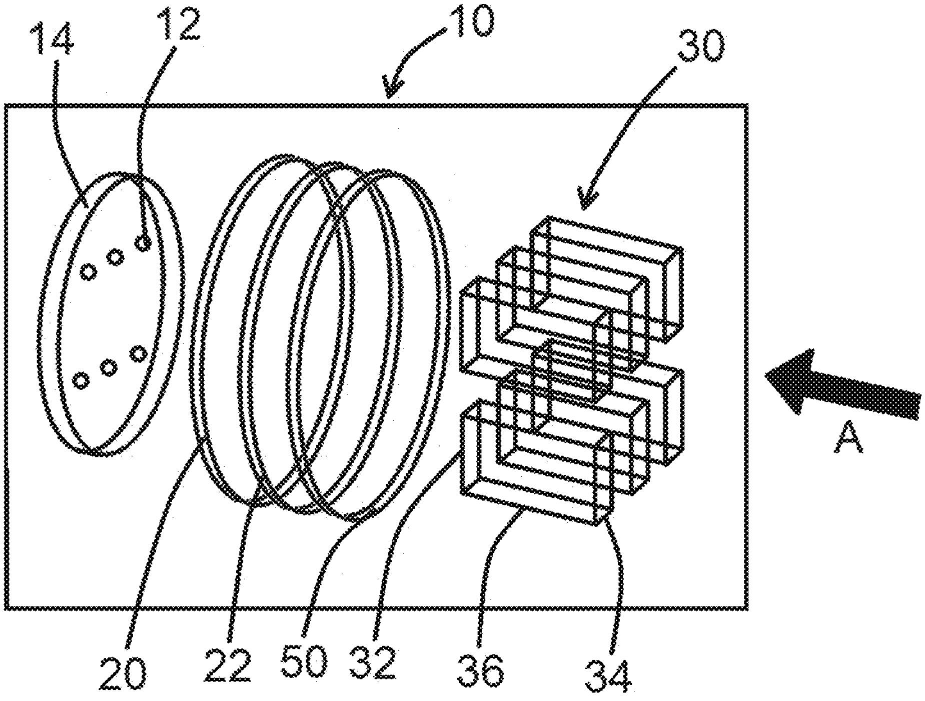

FIGS. 1A and 1B show projection devices 10 according to at least two embodiments of the present disclosure. As shown in FIG. 1A, the projection device 10 may include one or more light sources 12, a first lens 20, and a second lens 22, each positioned a distance or distances from one another, such that light emitted from the light source 12 is transmitted through the first lens 20 and the second lens 22. The first lens 20 and the second lens 22 may be structured and disposed relative to one another to generate a virtual, three-dimensional (3D) image 30 of the light source 12. The image 30 may be generated such that it appears to be located in space between the first lens 20 and the second lens 22 when viewed by an observer looking toward the light source 12 through the first lens 20 and second lens 22 in the general direction of arrow A. The image 30 may alternatively be generated such that it appears to be located after second lens 22, such as between second lens 22 and an outer lens 148 shown in FIG. 2, when viewed by an observer looking toward the light source 12 in the general direction of arrow A. The image 30 may have a length 32, a width 34, and a depth 36 from the perspective of the observer. The width 34 and the length 32 can be changed by changing the distance between first lens 20 and second lens 22, for example, or changing one or more of the distances between light source 12, first lens 20, and/or second lens 22. A third lens 50, such as shown in FIG. 1B, can be positioned relative to second lens 22 as shown in FIG. 1B, so that first lens 20, second lens 22, and third lens 50 generate a variable depth 36 to the lit image, thus generating a three-dimensional cube-lit image 30, for example. The embodiment depicted in FIGS. 1A and 1B include six, point light sources 12 arranged in an array 14, which generate six images 30 in cooperation with the first lens 20 and second lens 22. In certain embodiments, the projection device 10 may include fewer or more light sources 12. As shown in FIG. 1A, the image 30 of a point light source 12 may be projected as a hexahedron and/or an illuminated four-sided plane, or in the case of a device 10 using a first lens 20, a second lens 22, and a third lens 50, such as shown in FIG. 1B, an illuminated three-dimensional cube.

In at least one embodiment according to the present disclosure, the first lens 20 and the second lens 22 may be lenticular lenses. Generally, a lenticular lens has a plurality of convex flute optics or flutes 26 (not shown in FIG. 1A) arranged side by side such that the flutes 26 extend in the same direction, defining a longitudinal axis of the lens such that each flute 26 has an optical axis generally orthogonal to the longitudinal axis. The plurality of flutes 26 may enable a horizontal parallax as described further herein.

Figure 1C:
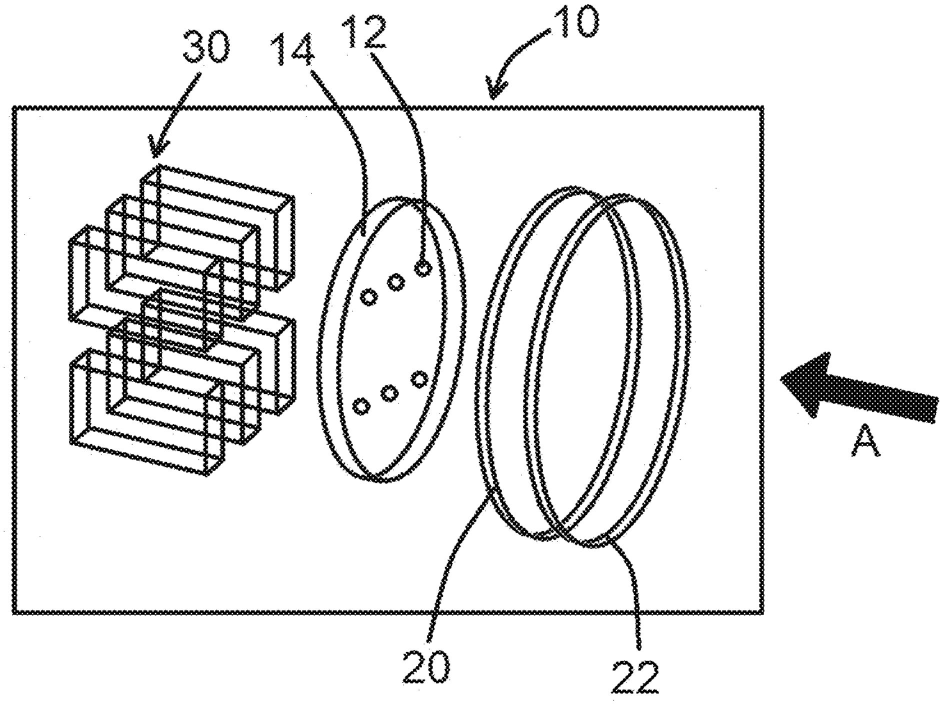
Figure 1D:
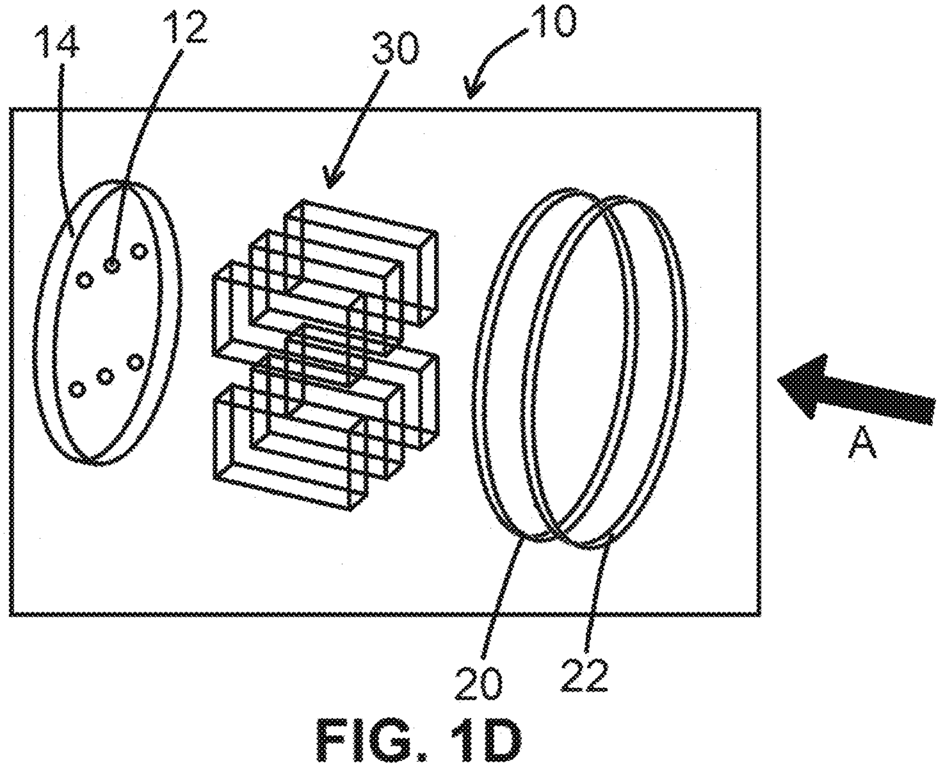
Figure 1E:
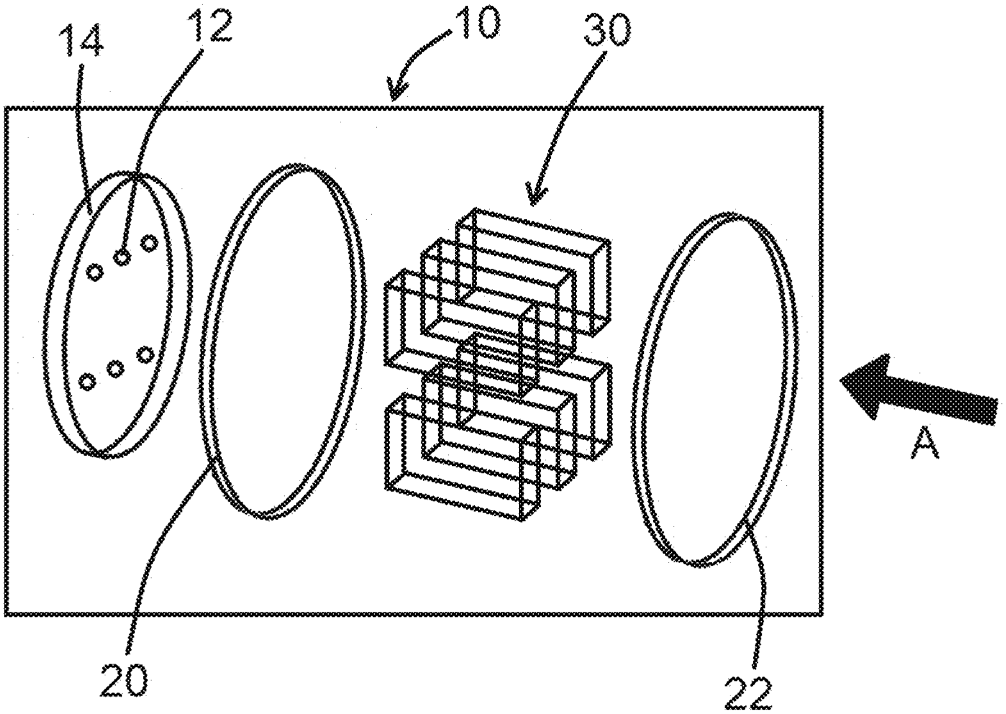
Figure 1F:
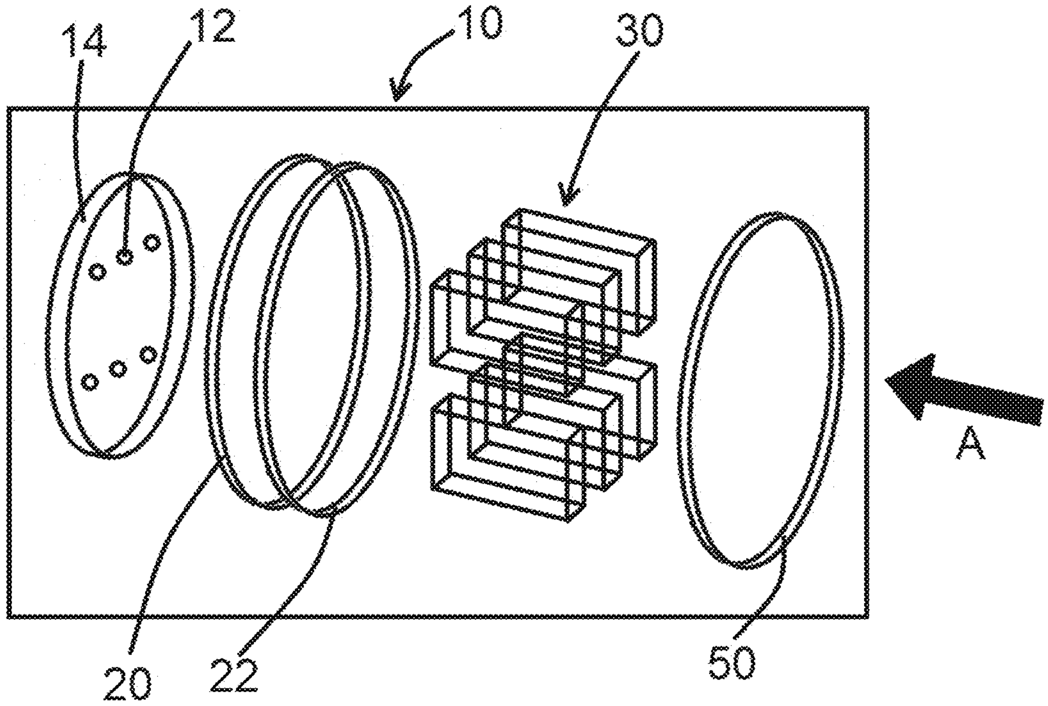

FIGS. 1C, 1D, 1E, and 1F show additional projection device 10 embodiments according to the present disclosure. Referring back to FIG. 1A, a viewer can perceive image 30 as being present beyond the first lens 20 and the second lens 22, such as between the second lens 22 and an outer lens 144 as referenced herein. Image 30 can be perceived as being present beyond the first lens 20, the second lens 22, and the third lens 50, as shown in FIG. 1B. Image 30, in various device embodiments, can be perceived by a viewer as being present behind light source 12 (such as shown in FIG. 1C), between light source 12 and first lens 20 (as shown in FIG. 1D), between the first lens 20 and the second lens 22 (as shown in FIG. 1E), or between the second lens 22 and the third lens 50 (such as shown in FIG. 1F), for example. Depending on the embodiment of device 10 prepared for a particular purpose, images 30 generated by said devices 10 can be perceived as being present at various locations within device 10, as referenced and shown herein.

Figure 4:
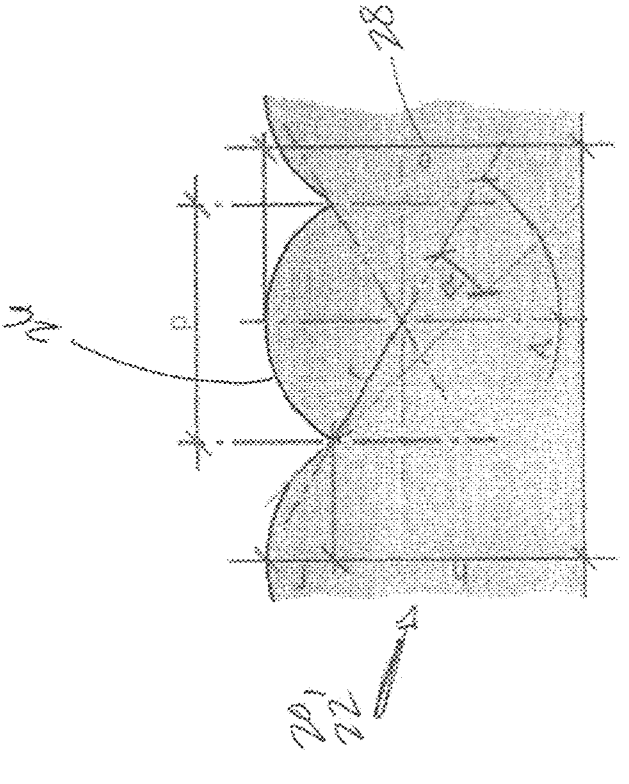
FIG. 4 shows a cross-sectional view of a lenticular lens according to an embodiment of the present disclosure.

FIG. 4 shows a cross-sectional view of portions of three flutes 26, one full flute and two partial flutes to either side. As shown in FIG. 4, the first lens 20 and the second lens 22 may have a thickness 28. The first lens 20 and the second lens 22 may have any suitable thickness 28 including, for example, 0.1-10 millimeters (mm). In certain embodiments, the thickness 28 of the first lens 20 and/or the second lens 22 may be between 1-3 mm. In at least one embodiment, the thickness 28 of the first lens 20 and/or the second lens 22 may be 1 mm. In various embodiments, lenticular flutes 26 may be on opposite sides of the same lens 20, 22, 50.

The first lens 20 and the second lens 22 may be further characterized by other dimensions defining the flutes 26 as shown in FIG. 4. The dimensional characteristics of the flutes 26 affect the images 30 projected by the projection device 10. For example, the density or spacing of the flutes 26 may characterized in lines per inch (LPI). In at least one embodiment, the first lens 20 and the second lens 22 may be formed with 20-150 LPI. In certain embodiments, the first lens 20 and the second lens 22 may have more LPI, while in other embodiments the first lens 20 and the second lens 22 may include fewer LPI. Other dimensional characteristics of flutes 26 may also affect the images 30 projected by the projection device 10. For example, the viewing angle of the flutes 26 is determined by the radius of the flutes 26. The higher the viewing angle, for example, the more curvature the projected image 30 will have. The viewing angle is described as the angle at which the viewer can move off axis and still see the projected image 30, as referenced herein.

Figure 5:
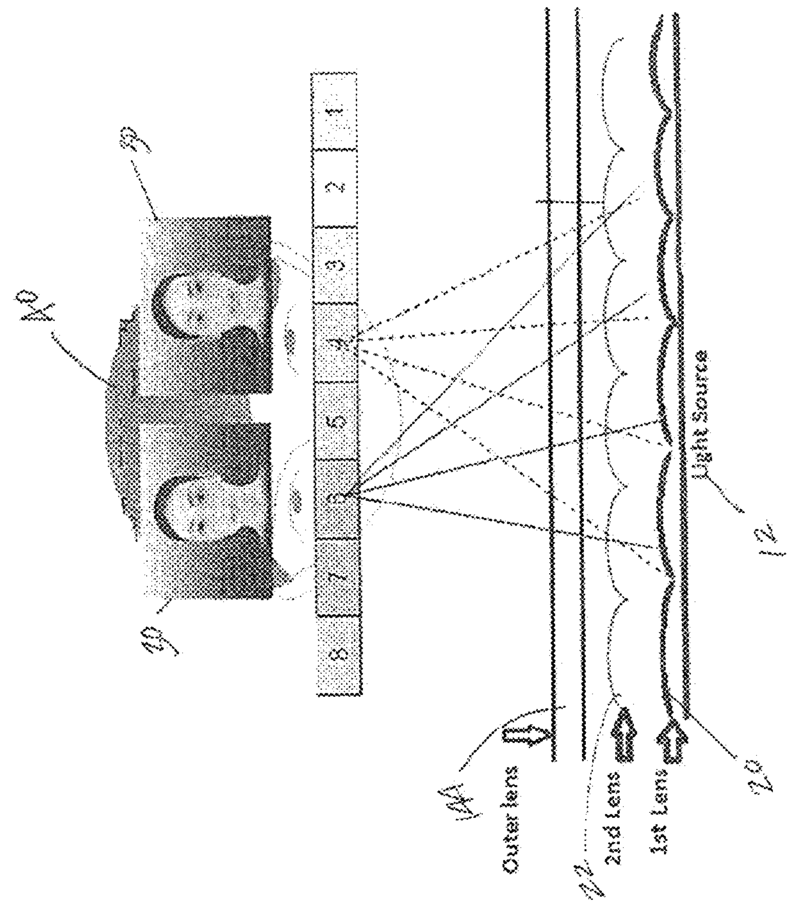
FIG. 5 shows a plan view of an embodiment of a projection device according to the present disclosure.

FIG. 5 illustrates the principle of operation of the first lens 20 in cooperation with the second lens 22 to generate the projected lit image 30. Images 30, as referenced herein, may also be referred to as projected images 30, three-dimensional images 30, lit images 30, etc. In FIG. 5, the image 30 is depicted as a human face to make clear that the interaction of the first lens 20 with the second lens 22 generates at least two separate perspectives of the light source 12, where each eye of an observer 40 views a different perspective. However, it will be understood that in embodiments of the present disclosure the image 30 may not resemble a human face. Instead, the image 30 is a stereoscopic composite image of the light source 12 formed by the observer 40 from the different perspective views of the light source 12 as perceived by each eye of the observer 40. Without being bound to a particular theory, the projection device 10 uses compound horizontal parallax enabled by the use of multiple lenticular lenses to generate a virtual 3D image 30 of the light source 12.

The image 30 is a projection of the light source 12. The first lens 20 projects a first line, such as the length 32, as light emitted by the light source 12 is bent at different angles by the individual flutes 26 of the first lens 20. The second lens 22 projects a second line at an angle to the first line, such as the width 34, as light transmitted through the first lens 20 is bent at different angles by the individual flutes 26 of the second lens 22. The combination of the two projected lines generates the image 30 in which the width 34 is determined by the distance between the first lens 20 and second lens 22.

The size, shape, and appearance of the image 30 are affected by the type of light source 12 and the characteristics of the first lens 20 and second lens 22. Further, the relative distances and orientations between the light source 12, the first lens 20, and the second lens 22 further affect the size, shape, and appearance of the images 30. In at least one embodiment, the first lens 20 may be oriented parallel to the light source 12. The second lens 22 (and third lens 50 in embodiments having a third lens 50) may be oriented parallel to the first lens 20. In such an embodiment, the image 30 of a point light source 12 is projected as a hexahedron, such as a regular hexahedron (i.e., a cube) or a rectangular cuboid. Alternatively, the second lens 22 may be oriented at an angle relative to the first lens 20 (i.e., tilt). In such an embodiment, the image 30 of a point light source 12 is projected as a non-regular hexahedron, such as a trapezohedron. The distances between the first lens 20, the second lens 22, and/or the third lens 50, affects the length 32, width, 34, and/or depth 36 of the image 30, causing the projected hexahedron to appear either wider, longer, or narrower. Rotation of the first lens 20 relative to the second lens 22 or the third lens 50, or tilting lenses 20, 22, and/or 50 relative to one another affects the aspect ratio of the image 30, causing the projected hexahedron to appear either wider or narrower in the width dimension 34 and/or potentially the length 32 dimension and/or the depth 36 dimension.

The appearance of the image 30 may be affected further by the angle of observation of the observer. The direction A depicted in FIGS. 1A and 1B is generally in line with an axis of the light source 12 and the optical axis of the first lens 20 and second lens 22. From such a vantage point, the observer may see the projected images 30 as shown in FIGS. 1A and 1B. As the observer moves horizontally from side to side, changing the direction A and the observer's angle to the light source 12 accordingly, the image 30 appears to flip as if the observer is then seeing the opposite side of the projected cube, for example going from observing the left to the right side of the cube. Likewise, when the vantage point of the observer moves vertically up and down relative to the light source 12, the image 30 appears to flip vertically as if the observer is then seeing the opposite vertical side of the projected cube, for example going from observing the top to the bottom side of the cube. In embodiments such as depicted in FIGS. 1A and 1B, having multiple lights source 12 spaced at a distance from one another both horizontally and vertically, the individual images 30 of each light source 12 will appear to flip at different angles of observation, creating an interesting and appealing visual effect.

Figure 8:
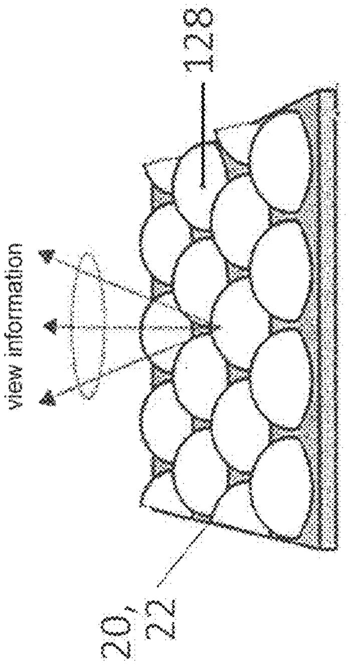
FIG. 8 shows various embodiments of a lens subassembly according to the present disclosure.

In at least one embodiment according to the present disclosure, the first lens 20 and the second lens 22 may be lenticular lenses having a plurality of spherical lenslets 128 as shown in FIG. 8. The spherical lenslets 128 may include parameters such as a radius of an individual lenslet 128 and a thickness of a plate or film upon which the lenslets 128 are disposed. The spherical lenslets 128 may enable an omnidirectional parallax, providing view information in a generally conically shaped field of view as shown in FIG. 8.

The first lens 20 and the second lens 22 may be substantially flat sheets, as depicted in FIGS. 1 and 5, upon which flutes 26 or lenslets 128 are disposed. In certain embodiments, the first lens 20 and/or the second lens 22 may have non-planar surfaces with curvature in two or three dimensions. For example, the first lens 20 and/or the second lens 22 may at least partial wrap around the light source 12 or follow a contour of an outer lens that defines the exterior styling of a lamp assembly including the projection device 10. In one form, individual flutes 26 or lenslets 128 of the first lens 20 and/or second lens 22 may be rotated with respect to its other flutes 26 or lenslets 128 such that the optical axes of some flutes 26 or lenslets 128 are normal position to the X-axis to compensate for diffused appearance and performance that may be observed at wide viewing angles from the perspective of the observer. Such an arrangement of flutes 26 and/or lenslets 128 may be applied particularly to the most inboard portions of the first lens 20 and/or second lens 22 relative to certain applications.

In certain embodiments, the first lens 20 and/or the second lens 22 may include laser etching or some other surface treatment that may further affect and/or visually interact with the appearance of the image 30 to enhance the 3D visual effect. In yet further embodiments, first lens 20 and/or the second lens 22 may include a decorative treatment to further enhance and/or visually interact with the appearance of the image 30. By way of non-limiting example, the decorative treatment may include a pad print logo that may be given an appearance of depth in cooperation with the image 30.

The first lens 20 and the second lens 22 may be formed by any suitable process including, without limitation, injection molding, compression molding/forming, vacuum forming, extruding, thermoset, and rolling. In at least one embodiment, the first lens 20 and/or the second lens 22 may be a relatively thin film. The first lens 20 and second lens 22 may be a transparent polymer including, without limitation, poly (methyl methacrylate), polycarbonate, and polyetherimide. In certain embodiments, the first lens 20 and second lens 22 may be glass.

Figure 2:
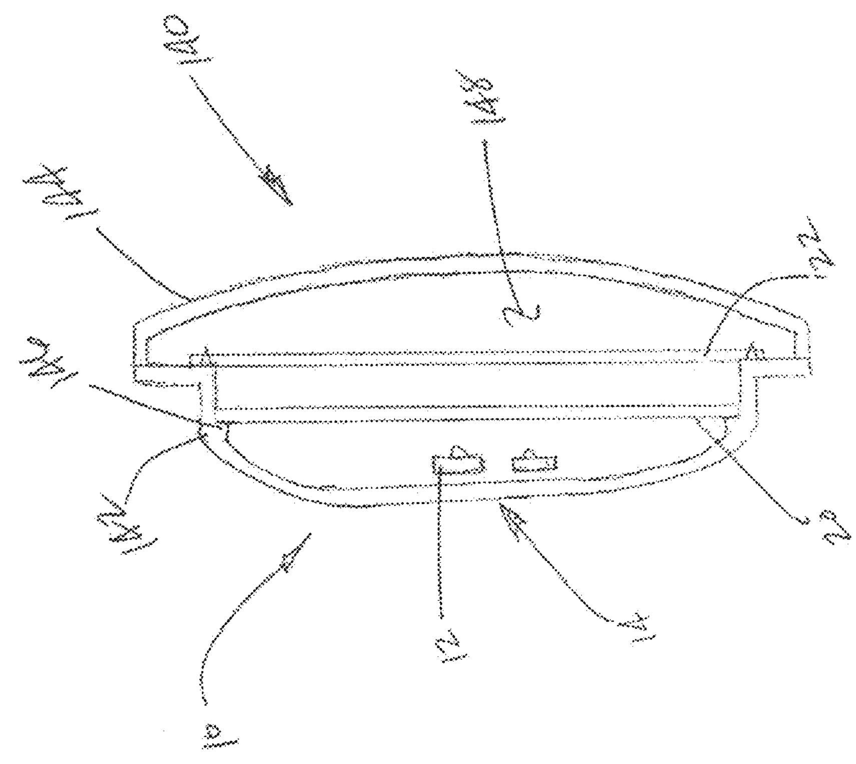
FIG. 2 shows a cross-sectional isometric view of an embodiment of a lamp assembly according to the present disclosure.

The projection device 10 may be incorporated into a lamp assembly 140 as shown in FIG. 2. The lamp assembly 140 may include an outer lens 144 attached to a housing 142 to form a volume 148 therebetween. The housing 142 and/or outer lens 144 may be structured to secure and position the projection device 10 within the volume 148. The housing 142 and/or outer lens 144 may be structured to establish and maintain the relative distance between the light source 12 (or array 14 of more than one light source 12), the first lens 20, and the second lens 22. In at least one embodiment, the housing 142 may include one or more bosses 146 structured to positively locate the first lens 20 and/or the second lens 22. In certain embodiments, the first lens 20 and/or the second lens 22 may be attached to the housing 142 by any suitable means. For example, the first lens 20 and/or the second lens 22 may be welded to the housing 142 using, without limitation, a sonic weld process, a vibration weld process, or thermal tack process. Alternatively or additionally, the first lens 20 and/or the second lens 22 may be attached to the housing 142 using an adhesive. In at least one embodiment, the housing 142, outer lens 144, first lens 20, and/or second lens 22 may be configured to trap the first lens 20 and/or the second lens 22 in the desire position without an additional means of attachment.

Figure 3:
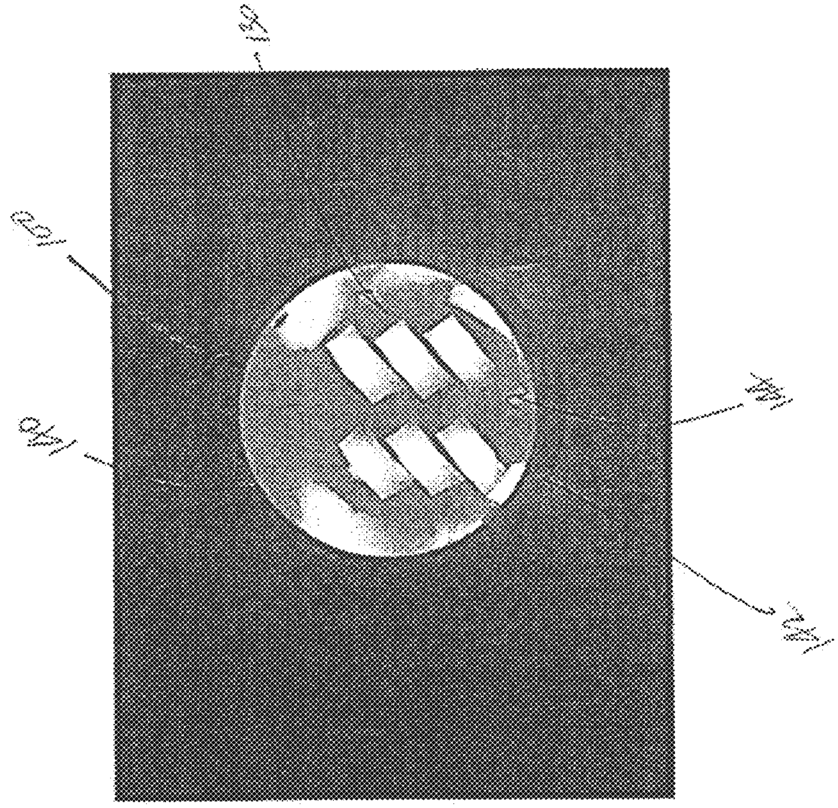
FIG. 3 shows an isometric view of a lit embodiment of a lamp assembly according to the present disclosure.

FIG. 3 shows a photograph of a lamp assembly 140 lit using a projection device 100 within a housing 142 and behind an outer lens 144. As shown in FIG. 3, the projection device 100 generates a three-dimensional image 130 for each light source of the lamp assembly 140. The outer lens 144 may have a substantially uniform thickness without optics formed therein. Alternatively, the outer lens 144 may include optics formed therein. In such embodiments, the optics of the outer lens 144 may affect the appearance of the image 130. For example, the outer lens 144 may include pillow optics or flutes that may enhance the appearance of the image 130. Further, as described herein with respect to the first lens 20 and second lens 22, the outer lens 144 may include decorative treatments configured to visually interact with the image 130.

In certain embodiments, the lamp assembly 140 may be an automotive exterior lamp configured to provide signaling and/or illuminating functions in accordance with applicable governmental regulations. In at least one embodiment, the lamp assembly 140 may be a tail lamp and may include tail and/or stop functions. In an embodiment, the lamp assembly 140 may be a park and signal lamp and may include park and/or turn functions. In yet another embodiment, the lamp assembly 140 may be sidemarker providing sidemarker functions. In certain embodiments, the lamp assembly 140 may include various different functions.

In at least one embodiment according to the present disclosure, the projection device 10 may include more than one pair of lenses, where the first lens 20 and second lens 22 define one pair. In such an embodiment, the additional pairs of lenses may enable varying the appearance of the image 30 within the same viewing angle. Further, the additional pairs of lenses may be applied to a portion of the field of view of the light source 12, for example at larger angles from the axis of the light source 12 and/or at the edges of the lamp assembly 140.

Figure 6:
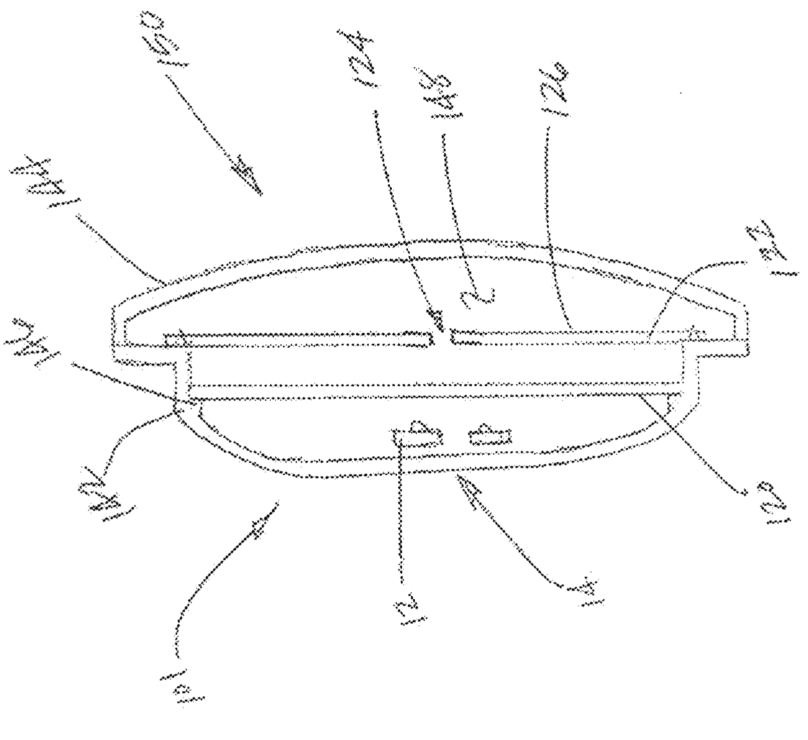
FIG. 6 shows a cross-sectional isometric view of an embodiment of a lamp assembly according to the present disclosure.

In an alternative embodiment according to the present disclosure, a blocker plate 122 may be substituted for at least one of the lenticular lenses as shown in FIG. 6. In such an embodiment, a lamp assembly 150 may include a projection device 101 between the housing 142 and outer lens 144 within the volume 148. As shown in FIG. 6, the projection device 101 may include one or more light sources 12 arranged in the array 14 and oriented to emit light through a first lens 120 and subsequently toward the blocker plate 122. The blocker plate 122 includes at least one aperture 124 through a substantially opaque body portion 126. The aperture 124 may be proportioned to block all light from the light source 12 except a desired shape of light to generate the desired image 30. Accordingly, the aperture 124 may be proportioned to a specific size and/or shape including, for example, logo patterns, emblems, letters, cylinders, triangles, or any desired shape. In one form, the aperture 124 may have a width of about 2 mm (in the dimension as shown in the cross-sectional view of FIG. 6). The aperture 124 may further have a length selected to generate the desired image 30. The length of the aperture 124 may be defined orthogonal to the width or at a desired angle off from orthogonal. In at least one embodiment, the length may be about 50 mm in a dimension orthogonal to the width.

Figure 7:
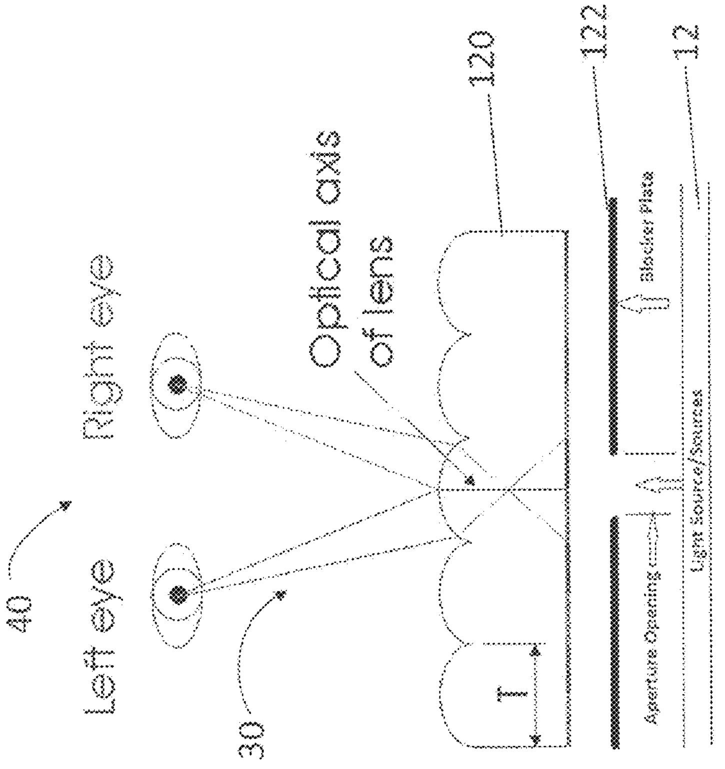
FIG. 7 shows a plan view of an embodiment of a projection device according to the present disclosure.

The proportions and/or shape of the aperture 124 may be selected with respect to the size and shape of the lamp assembly 150, the number of light sources 12, the desired functions of the lamp assembly 150, and/or the desired projected image 30. FIG. 7 illustrates the principle of operation of the first lens 120 in cooperation with the blocker plate 122 to generate the image 30. As shown in FIG. 7, the image 30 is generated by the interaction of the first lens 120 with the blocker plate 122 to create two separate perspectives of the light source 12, where each eye of the observer 40 views a different perspective. Accordingly, the image 30 is a stereoscopic composite image formed by the observer 40 from the different perspective views of the light source 12 as perceived by each eye of the observer 40 through the blocker plate 122.

The blocker plate 122 may be separated from the first lens 120 by a suitable distance. The closer the blocker plate 122 is to the first lens 120, the wider the angle of separation between the left and right images. Further, the relative position and orientation of the blocker plate 122 to the first lens 120 affects the shape, proportion, and viewing angle of the image 30. The relative position and orientation of the blocker plate 122 to the first lens 120 may be selected to generate the desired image 30. In certain forms, the blocker plate 122 may be a parallax barrier.

The blocker plate 122 may be formed of an opaque material such as, without limitation, a polymer, including poly(methyl methacrylate), polycarbonate, and polyetherimide, or a metal. In certain embodiments, the blocker plate 122 may be coated or painted to form the opaque body portion 126. For example, the blocker plate 122 may include a metalized finish of aluminum, nickel, or any suitable material to enable the desired appearance. In such an embodiment, the metalize finish may be applied by painting, chemical vapor deposition, physical vapor deposition, or any suitable process.

Referring to FIG. 6, the housing 142 of the lamp assembly 150 may be configured to secure and position the projection device 101 within the volume 148. The housing 142 and/or outer lens 144 may be structured to establish and maintain the relative distance between the light source 12 (or array 14 of more than one light sources 12), the first lens 120, and the blocker plate 122. In at least one embodiment, the housing 142 may include one or more bosses 146 structured to positively locate the first lens 20 and/or the blocker plate 122. In certain embodiments, the first lens 20 and/or the blocker plate 122 may be attached to the housing 142 by any suitable means. For example, the first lens 20 and/or the blocker plate 122 may be welded to the housing 142 using, without limitation, a sonic weld process, a vibration weld process, or thermal tack process. Alternatively or additionally, the first lens 20 and/or the blocker plate 122 may be attached to the housing 142 using an adhesive. In at least one embodiment, the housing 142, outer lens 144, first lens 20, and/or blocker plate 122 may be configured to trap the first lens 20 and/or blocker plate 122 in the desire position without an additional means of attachment. As shown in FIG. 6, the blocker plate 122 may be disposed between the first lens 120 and the outer lens 144. Alternatively, the blocker plate 122 may be disposed between the first lens 120 and the light source 12 as shown in FIG. 7.

In another embodiment, the light source 12 need not be disposed directly behind the first lens 20, 120, the second lens 22, and/or the blocker plate 122 as shown in FIGS. 2 and 6. In such an embodiment, the light source 12 may be disposed relative to an intermediary optical device such that the image 30 is generated from a virtual image of the light source 12 as indirectly enabled by the intermediary optical device. For example, the light source 12 may be disposed relative to a reflector such that the image 30 is generated from a virtual image of the light source 12 as indirectly reflected via the reflector. In one form, the light source 12 could be disposed at a proximal end of a light pipe or guide such that the image 30 is generated from a virtual image of the light source 12 as indirectly refracted and reflected through the light pipe or guide.

Alternatively, other embodiments of the present disclosure may not include the light source 12. In such an embodiment, the image 30 may be generated by the reflection of ambient light entering the projection device 10 or projection device 101 through the first lens 20, 120, second lens 22, and/or blocker plate 122 from a source external to the device 10, 101. For example, the ambient light source may be sunlight, street lighting, area lighting, or any suitable source.

The light source 12 may be a point source, for example a light-emitting diode (LED) or a laser diode. In embodiments including more than one light source 12, the light sources 12 may be spaced from one another by 10 mm or more. In at least one such embodiment, the light sources 12 are spaced apart by about 60 mm.

In certain embodiments, the light source 12 may be a line source, such as a gas discharge (e.g., neon) tube, an edge-lit micro-optic sheet, or a light pipe. In yet other embodiments, the light source 12 may have other form factors, for example high intensity discharge arcs, halogen bulbs, or incandescent bulbs. The form factor of the light source 12 may affect the shape, size, and appearance of the generated image 30. The form factor of the light source 12 may be affected by an intermediary optical device such as an indirect reflector, Fresnel lens, light pipe, or edge-lit micro-optic sheet, as described herein.

Figure 9A:
FIGS. 9A-16B show exemplary three-dimensional images generated by exemplary devices of the present disclosure.
Figure 9B:
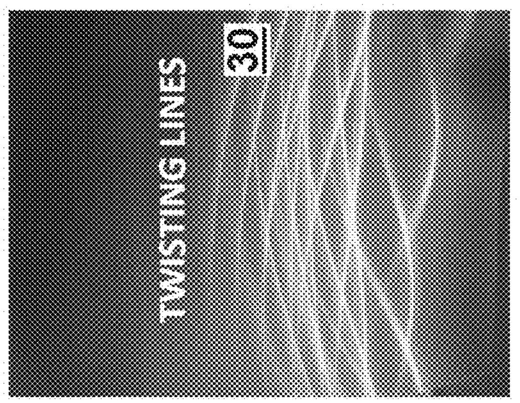
Figure 9C:
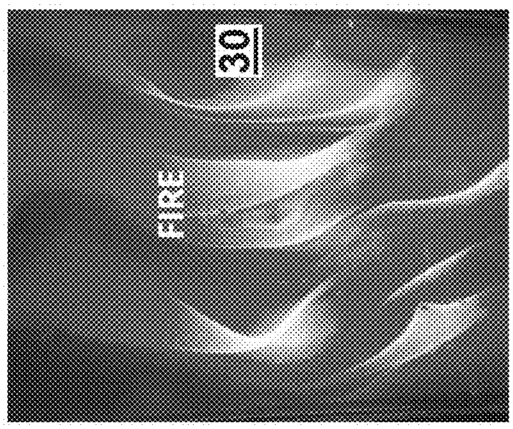
Figure 9D:
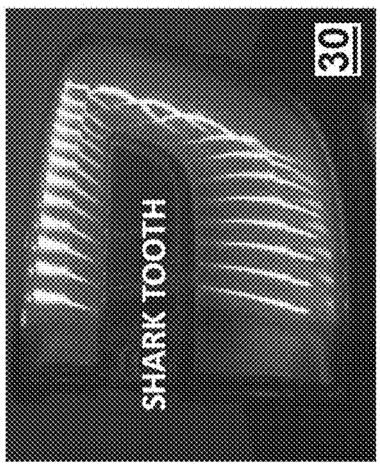
Figure 9E:
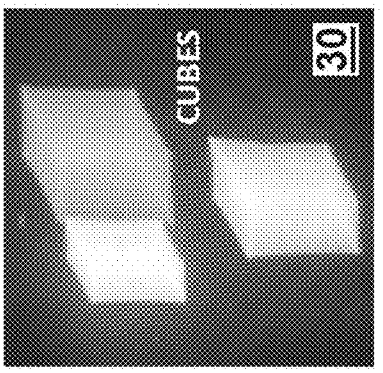

FIGS. 9A-18 show additional embodiments of three-dimensional images 30, 130 generated using various device 10, 100, 101 embodiments of the present disclosure, such as those including a first lens 20, a second lens 22, and at least one additional lenticular lens (such as a third lens 50). FIG. 9A shows a three-dimensional image 30 projected to appear as a ribbon image (a series of ribbons), FIG. 9B shows a three-dimensional image 30 projected to appear as a series of twisting lines, and FIG. 9B shows a three-dimensional image 30 of the present disclosure projected to appear as fire. FIG. 9D shows a three-dimensional image 30 of the present disclosure projected to appear as shark teeth (having a shark tooth configuration), and FIG. 9E shows a three-dimensional image 30 of the present disclosure projected to appear as one or more cubes.

Figure 10A:
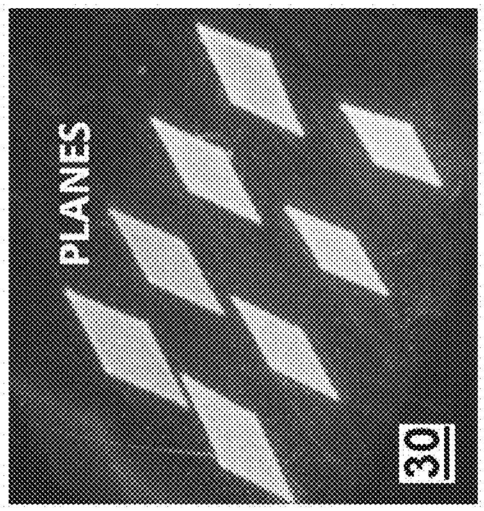
Figure 10B:
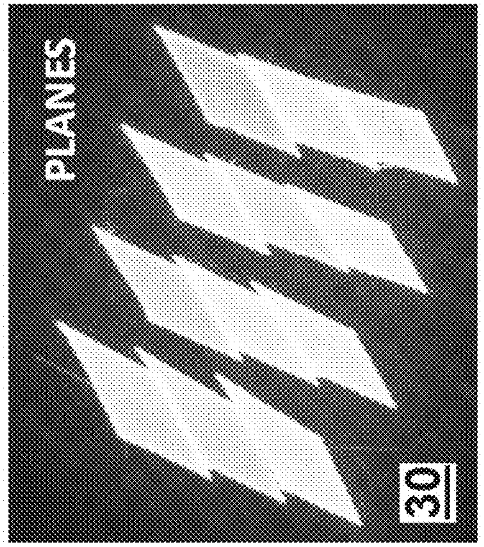
Figure 10C:
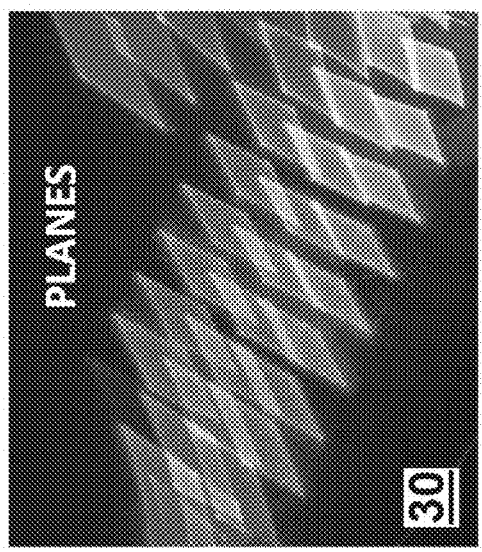
Figure 10D:
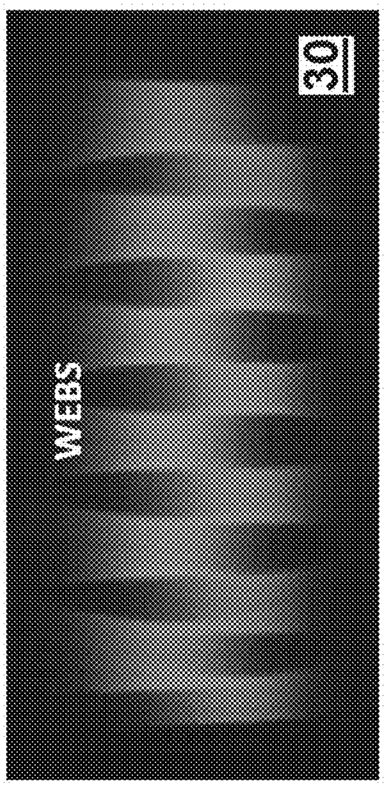
Figure 11A:
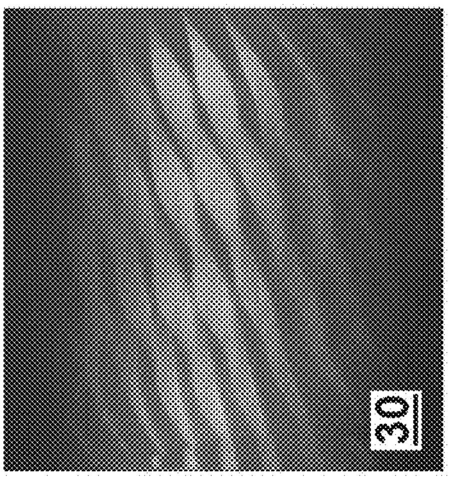
Figure 11B:
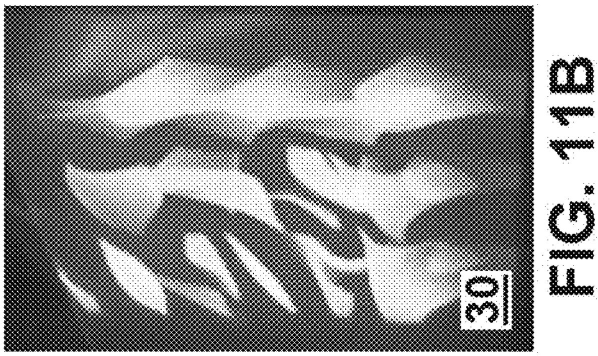
Figure 11C:
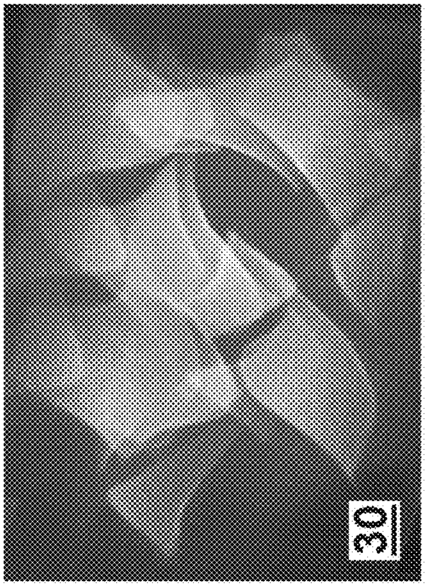
Figure 11D:
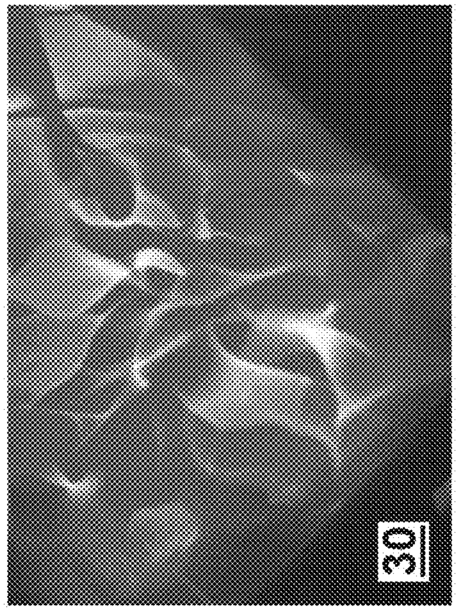
Figure 11E:
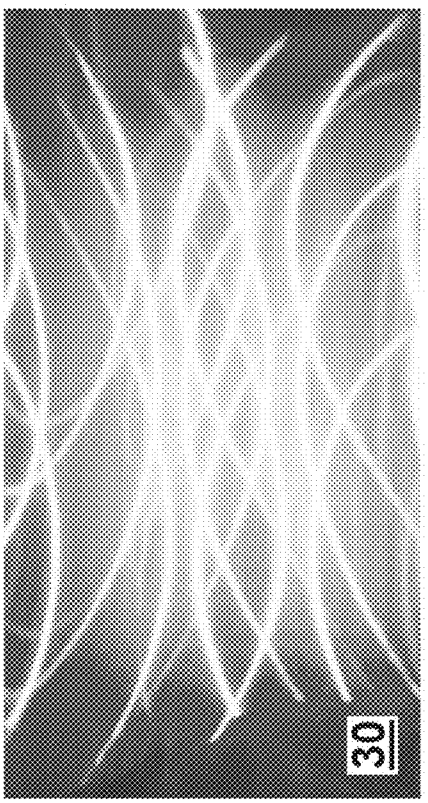
Figure 12A:
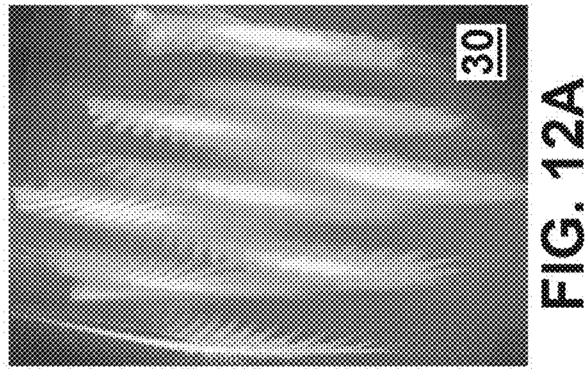
Figure 12B:
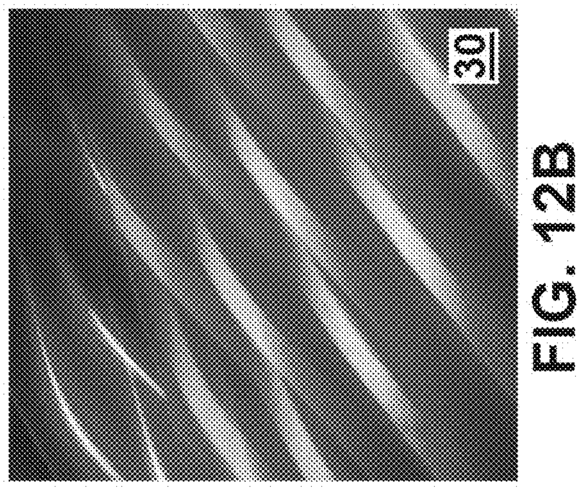
Figure 12C:
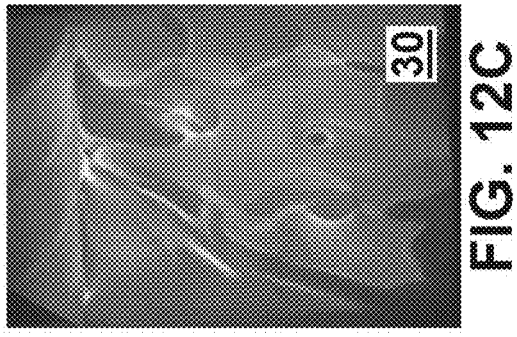
Figure 12D:
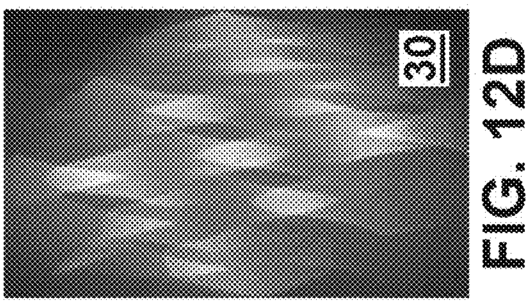
Figure 12E:
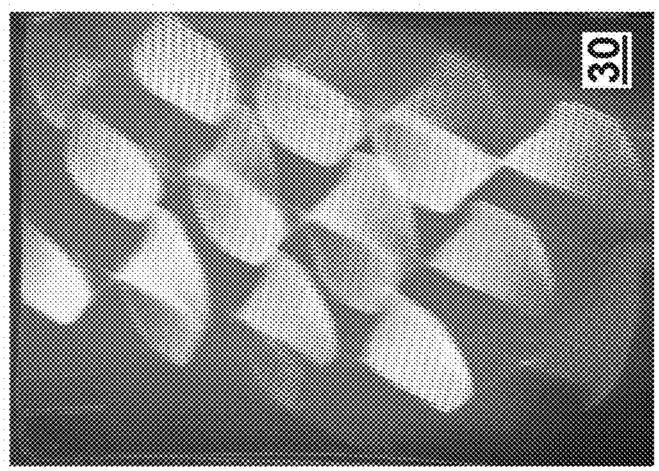

FIGS. 10A-10C show various embodiments of three-dimensional images 30, projected to appear as a series of planes (diamond-shapes), whereby any number of planes can be generated using devices 10, 100, 101. FIG. 10D shows a three-dimensional image 30 of the present disclosure projected to appear as webs (interconnected shapes). FIGS. 11A-12E show various other embodiments of three-dimensional images 30 of the present disclosure, having various twisted shapes (FIG. 11A), curved and pointed shapes (FIGS. 11B, 11C, and 11D), a series of curved lines (FIG. 11E), fringed leaf shapes (FIG. 12A), ribbons (FIG. 12B), amorphous shapes (FIGS. 12C and 12D), and/or curved triangle shapes (FIG. 12E).

Figure 13A:
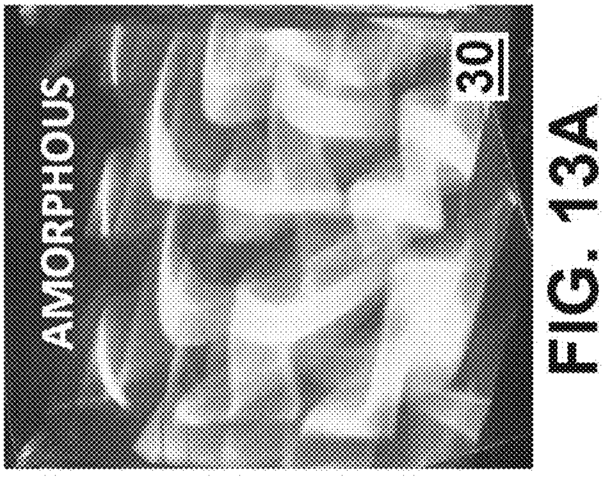
Figure 13B:
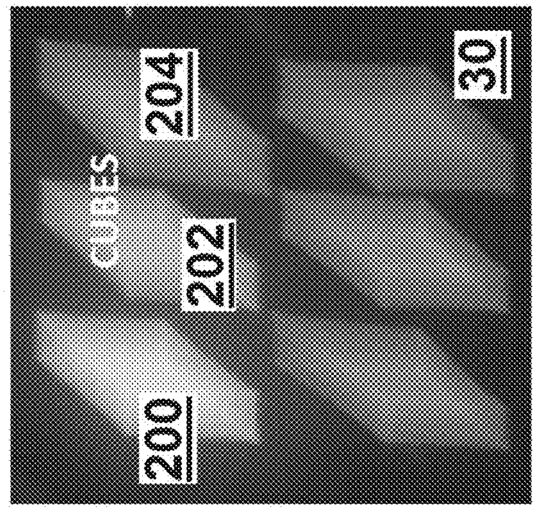
Figure 13C:
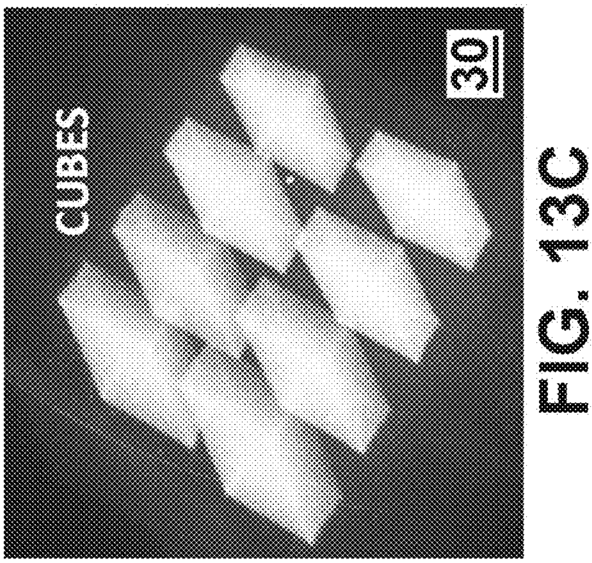

Three-dimensional images 30 of the present disclosure may also be generated as shown in FIGS. 13A-18. FIG. 13A shows a three-dimensional image 30 of the present disclosure projected as having an amorphous shape, while FIGS. 13B and 13C shows three-dimensional images 30 of the present disclosure projected to appear as a series of cubes. As shown in FIG. 13B, for example, various three-dimensional images 30 of the present disclosure can include and/or project one or more colors, such as a first color 200, a second color 202, and a third color 204, for example. Said colors 200, 202, 204 can be/include any number of colors, such as red, blue, white, yellow, etc. In at least one embodiment, color 200 comprises red, color 202 comprises blue, and color 204 comprises yellow. In at least another embodiment, first color 2020 comprises blue, second color 202 comprises red, and third color 204 comprises yellow. Various devices 10, 100, 101 of the present disclosure, therefore, can be configured to project one or more colors 200, 202, and/or 204, for example.

Figure 13D:
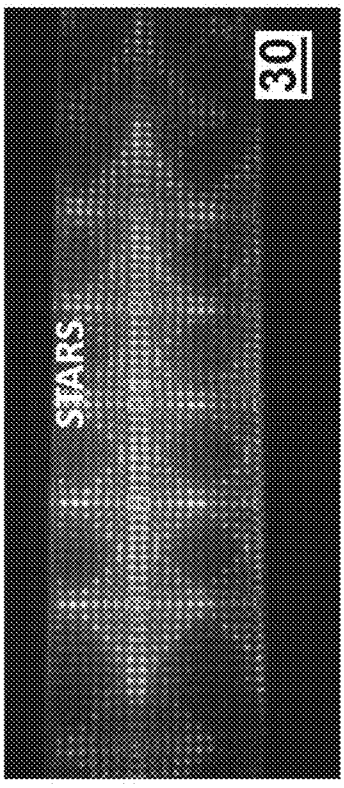
Figure 13E:
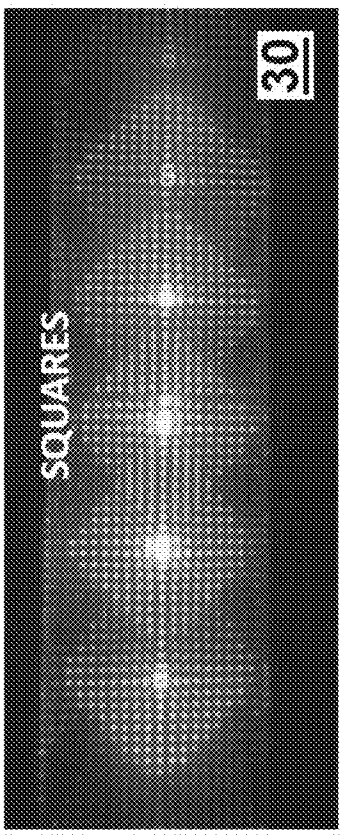
Figure 14A:
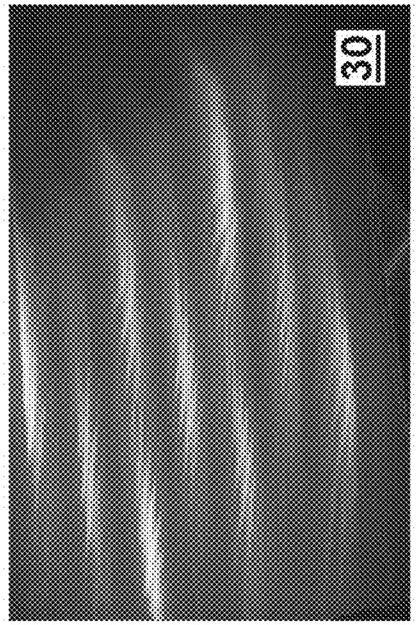
Figure 14B:
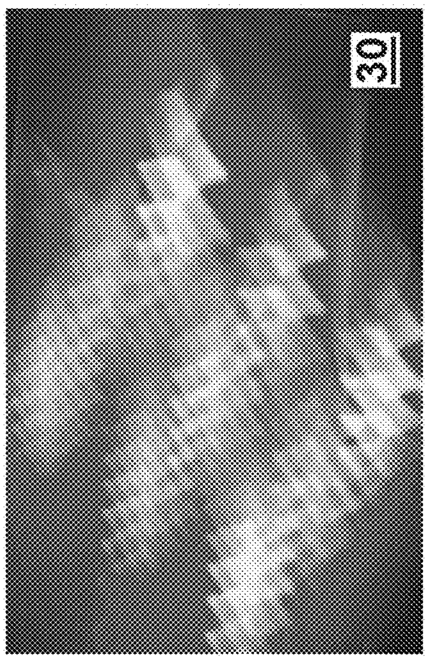
Figure 14C:
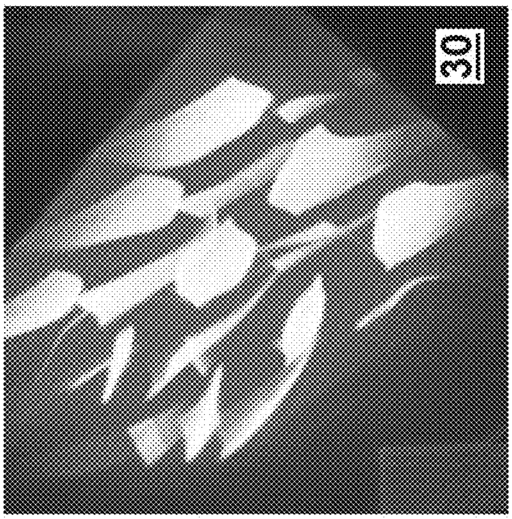
Figure 14D:
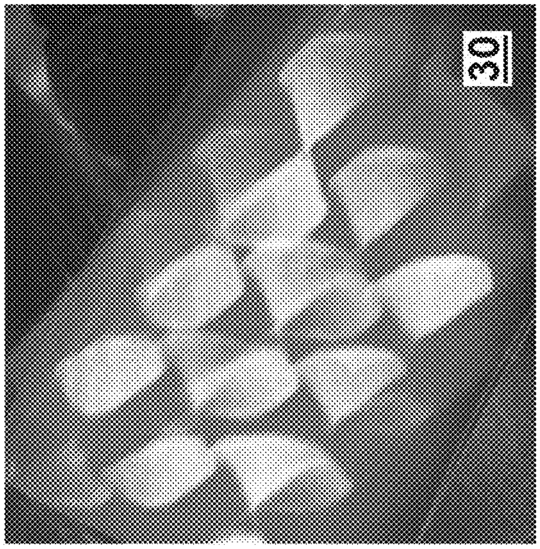
Figure 15A:
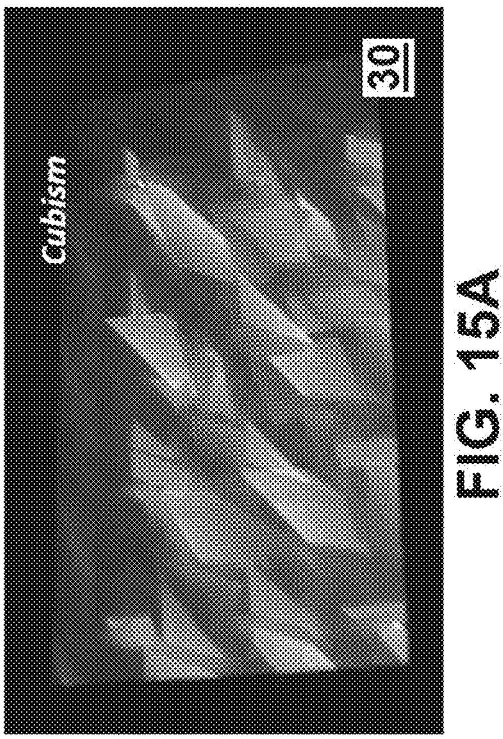
Figure 15B:
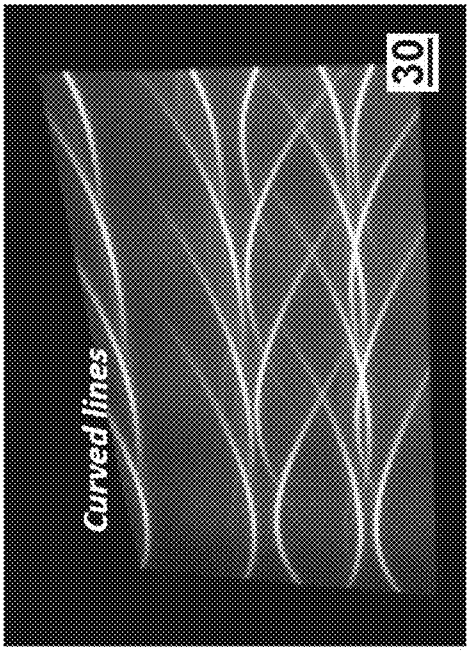
Figure 15C:
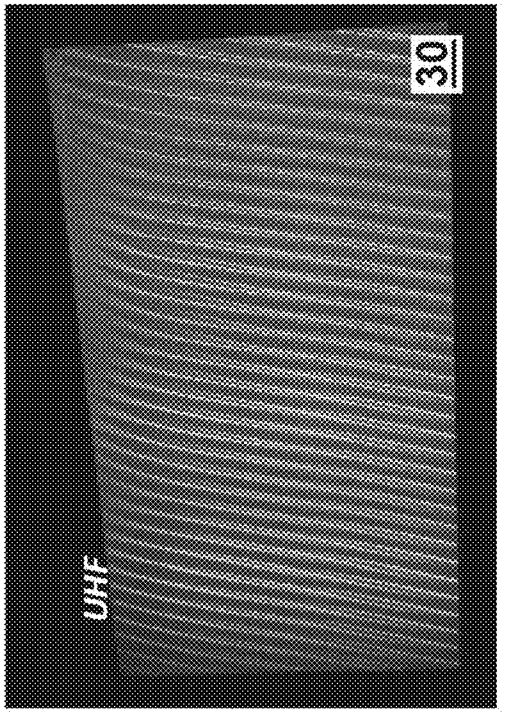
Figure 15D:
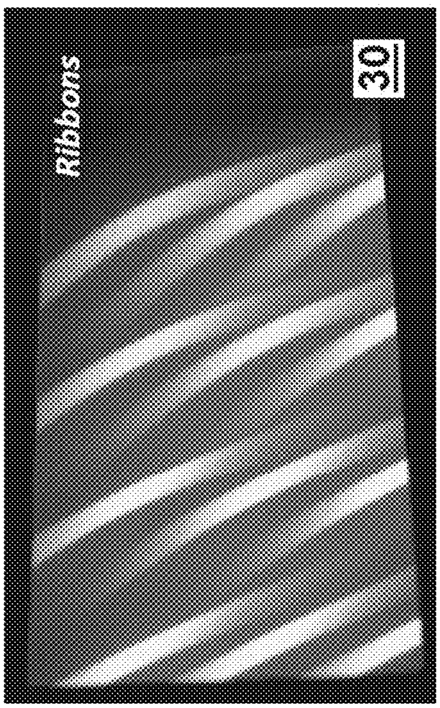
Figure 16A:
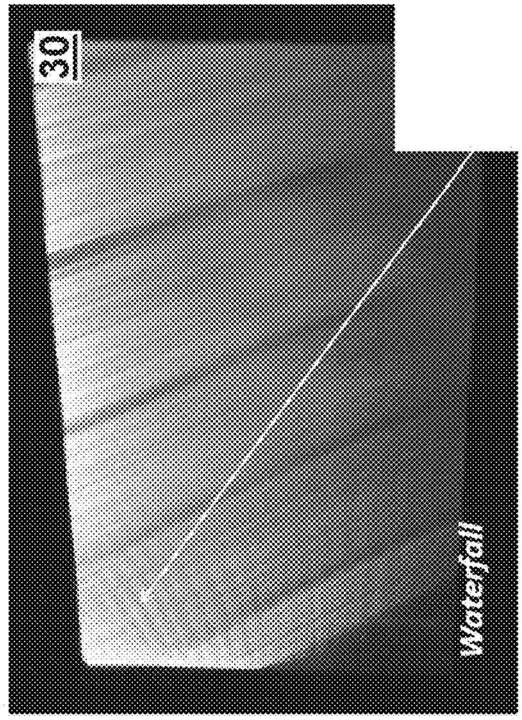
Figure 16B:
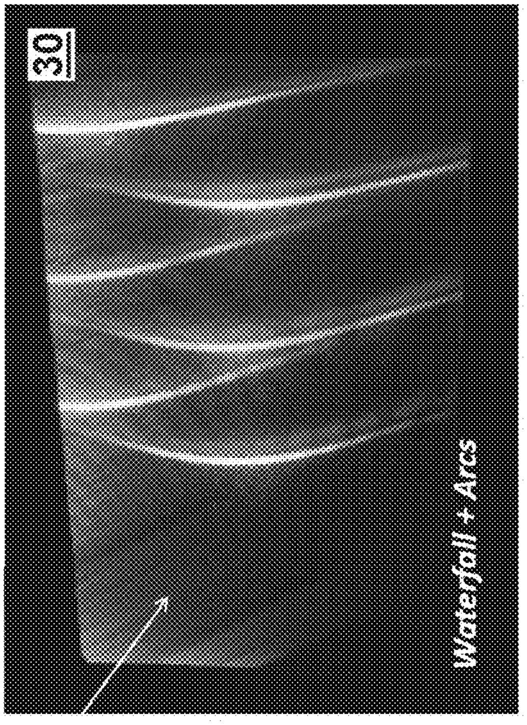

FIG. 13D shows a three-dimensional image 30 of the present disclosure projected to appear as a series of stars, and FIG. 13E shows a three-dimensional image 30 of the present disclosure projected to appear as a series of squares. FIGS. 14A, 14B, 14C, and 14D shows three-dimensional images 30 of the present disclosure projected as having various amorphous shapes. FIG. 15A shows a three-dimensional image 30 of the present disclosure projected to appear as having a cubism pattern, while FIG. 15B shows a three-dimensional image 30 of the present disclosure projected to appear as a series of curved lines. FIG. 15C shows a three-dimensional image 30 of the present disclosure projected to appear as a pattern of adjacent curved lines, such as a ultra-high frequency ("UHF"), and FIG. 15D shows a three-dimensional image 30 of the present disclosure projected to appear as a series of ribbons. FIG. 16A shows a three-dimensional image 30 of the present disclosure projected to appear as a waterfall, while FIG. 16B shows a three-dimensional image 30 of the present disclosure projected to appear as a waterfall and arcs.

Figure 17A:
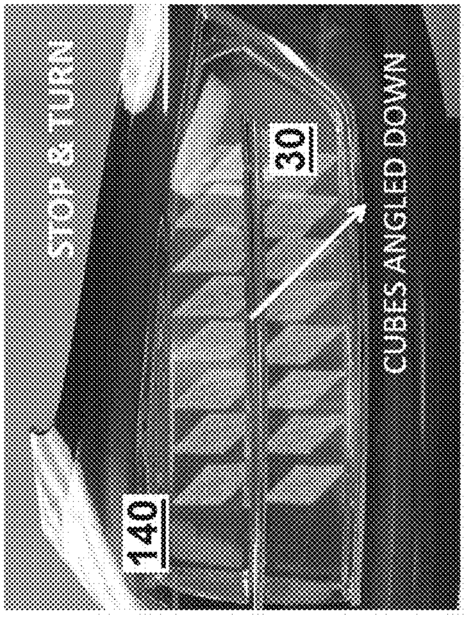
FIGS. 17A-19 show exemplary lamp assemblies having exemplary three-dimensional images generated therein.
Figure 17B:
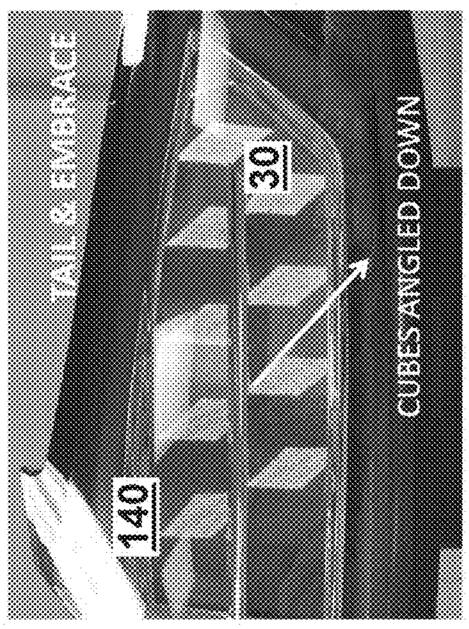
Figure 18:
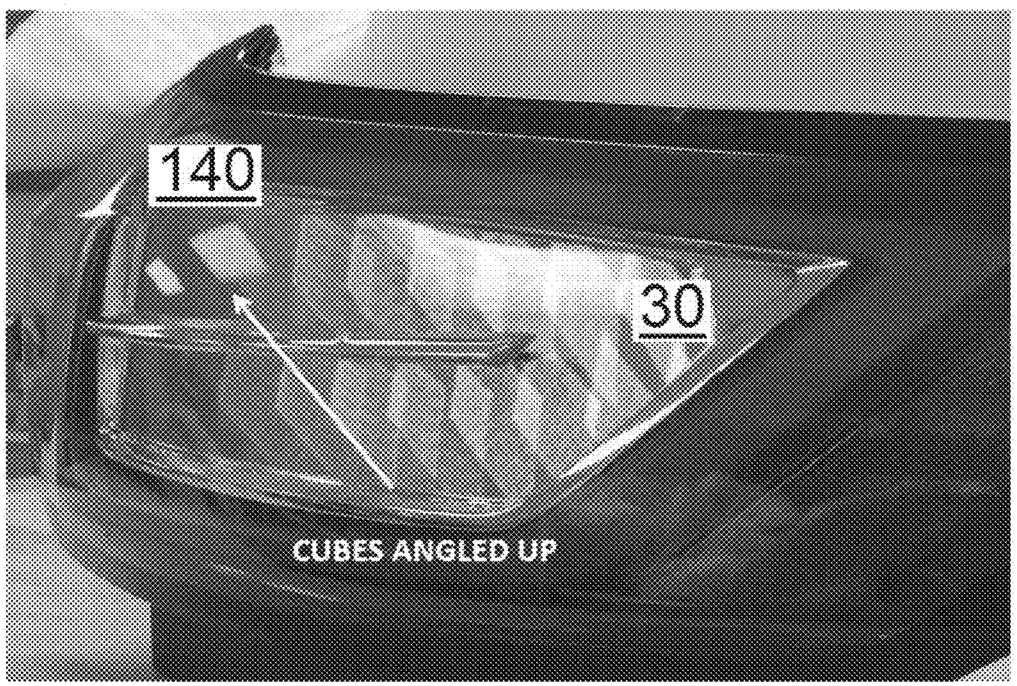

FIGS. 17A and 17B show exemplary lamp assemblies 140 of the present disclosure (which could also be lamp assemblies 150, as referenced herein), each shown as projecting three-dimensional images 30 as generally referenced herein. FIG. 17A shows an embodiment of a lamp assembly 140 projecting a three-dimensional image 30 that differs from the three-dimensional image 30 projected in FIG. 17B, noting that the same lamp assembly 140, 150 of the present disclosure can project different images 30 as may be desired. For example, one image 30 could be projected when a vehicle using lamp assembly 140 is stopped and/or is turning, and another image 30 could be projected when the vehicle is not stopped, such as a daytime light while driving. In embodiments when one lamp assembly 140 can project two or more images 30, one image 30 may be in a first orientation, and another image 30 may be in a second and different orientation, such as a flipped orientation or another different orientation from the first orientation, such as shown in FIG. 18.

Figure 19:
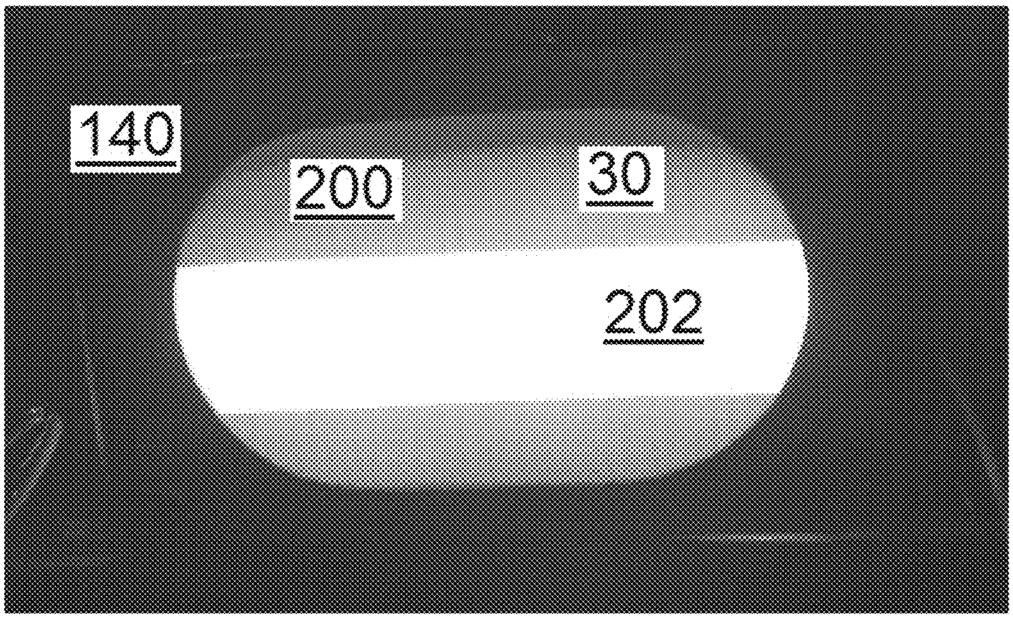

FIG. 19 shows an additional lamp assembly 140 embodiment of the present disclosure, configured to project a three-dimensional image 30 having at least two colors (such as a first color 200 and a second color 202). Image 30, as shown therein, may appear as a series of horizontal bars, for example, and is referred to as a homogenous image.

Figure 20:
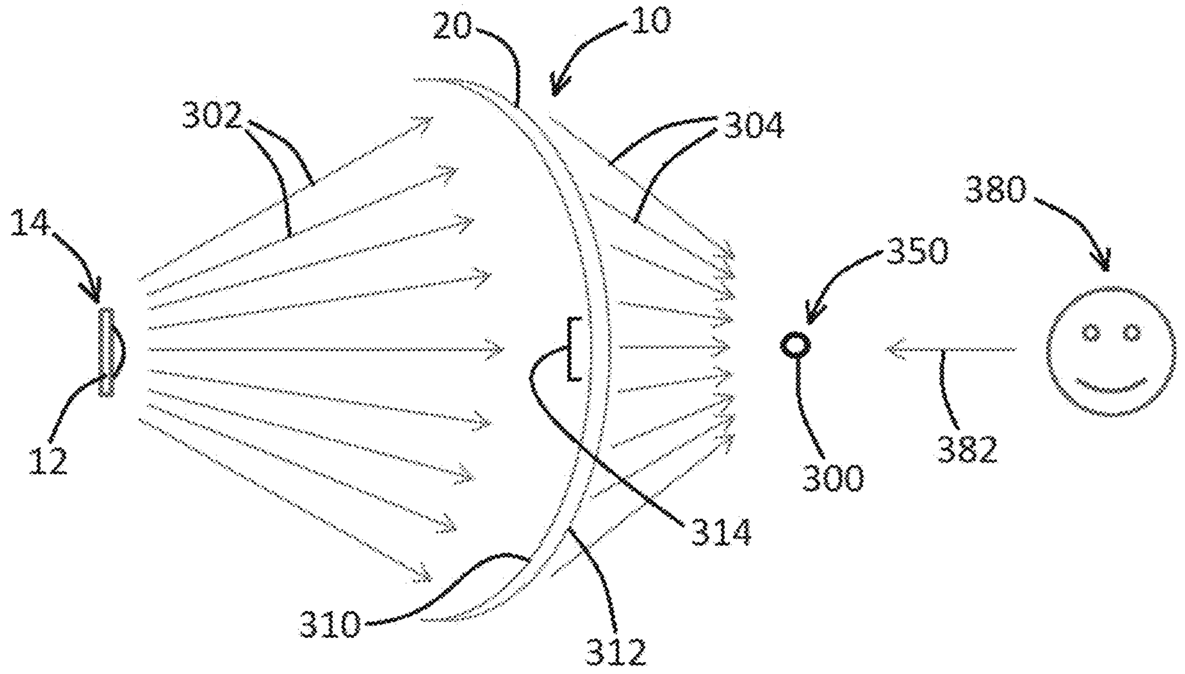
FIG. 20 shows a schematic of a projection device having a curved lens according to the present disclosure.

The present disclosure also includes disclosure of additional projection devices 10, as shown in FIG. 20. As referenced above, and in certain embodiments, the first lens 20 and/or the second lens 22 may have non-planar surfaces with curvature in two or three dimensions. FIG. 20 shows elements of an exemplary projection device 10 of the present disclosure, whereby projection device 10 is configured so to generate an image 300 of a homogenous pin stripe, lit pin, or light bar (as referenced in further detail below), shown as a line drawing in FIG. 21 and depicted via photograph in FIG. 22. In such an embodiment, a first lens 20 is used, whereby first lens has a curvature as shown in FIG. 20 and positioned relative to light source 12, or an array 14, as shown therein. Light source 12/array 14 would be positioned relative to curved first lens 20 so that light from light source 12/array 14 (referred to herein as light source light 302) would be directed toward a concave portion 314 of curved first lens 20, such as a curved lenticular first lens 20.

Figure 21:
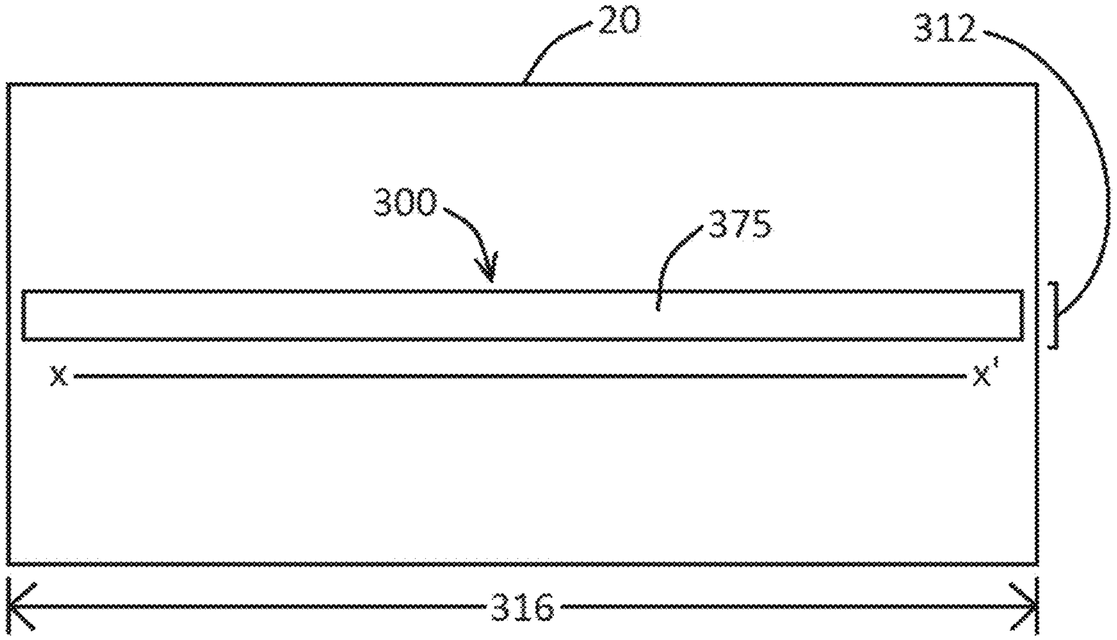
FIG. 21 shows a front view of a curved lens used to generate a homogenous light bar according to the present disclosure.
Figure 22:
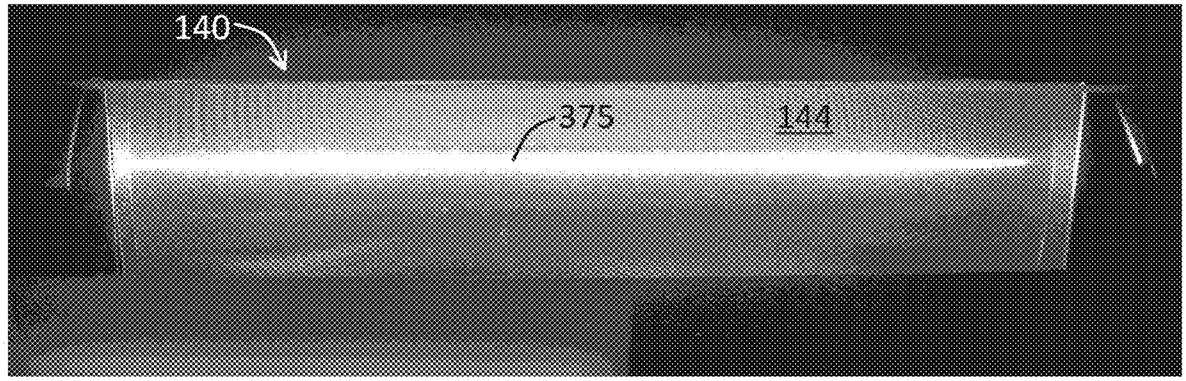
FIG. 22 is a photograph showing a homogenous light bar generated using a lamp assembly according to the present disclosure.

Light source light 302 being directed to concave portion 310 of curved first lens 20, would pass through curved first lens 20 and be refracted (as refracted light 304) such that the refracted light 304 would converge toward a general convergence location 350 adjacent to a relative middle 312 of curved first lens 20, such as shown in FIG. 21. Convergence location 350 would exist distal to curved first lens 20 (relative to curved first lens 20, such that light source 12/array 14 would be relatively proximal to curved first lens 20) adjacent to a convex portion 314 of curved first lens 20. Said convergence of refracted light 304, using an elongated curved first lens 20 (such as a curved lenticular lens or sheet), would generate a homogenous light bar 375 extending along a general length 316 of curved first lens 20 adjacent to a relative middle 312 of curved first lens 20, such as shown in FIG. 21. As shown in FIG. 21, length 316 of curved first lens is within the same axis (defined by x-x' in the figure) as the homogenous light bar 375, corresponding to relative middle 312 (the apex curve) of curved first lens.

Said homogenous light bar 375 is generated by way of the general convergence of refracted light 304 at convergence location 350, such as shown in FIG. 21. The image 300 (such as homogenous light bar 375, shown in FIG. 21) generated using projection devices 10 of the present disclosure can be viewed by a viewer 380 (a person, for example, such as shown in FIG. 20), looking in a direction toward projection device 10 and/or lamp assemblies 140 (discussed in further detail herein), such as shown via viewing direction arrow 382 in FIG. 20.

Figure 23:
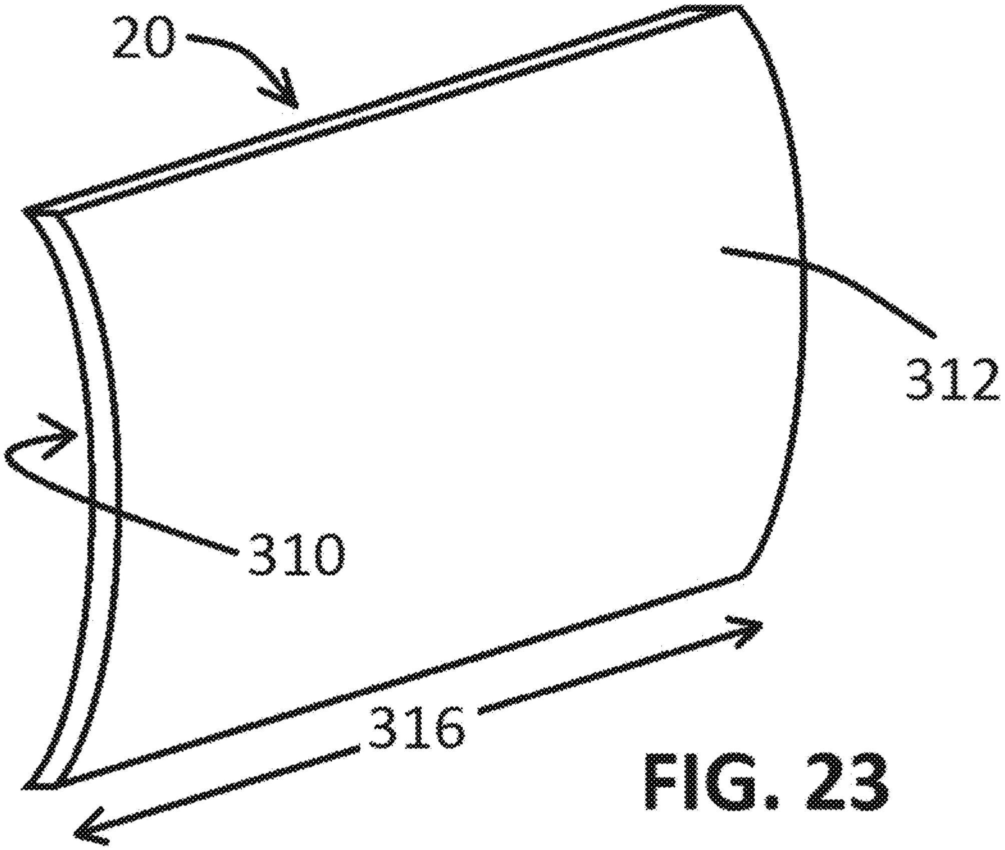
FIG. 23 shows a perspective view of a curved lens having a length according to the present disclosure.

FIG. 23 shows an exemplary curved first lens 20 of the present disclosure. As shown therein, curved first lens defines (or is configured to have) a concave portion 310, a convex portion 314, and a length 316, whereby, for example, homogenous light bar 375 can be generated using light source 12, or an array 14 of light sources 12, as referenced herein using said curved first lens 20. Homogenous light bar 375 may also be referred to as a two-dimensional image 300. Curved first lens 20 can be positioned relatively horizontally, vertically, or diagonally, as may be desired, within or outside of a housing 142, so to generate homogenous light bar 375 in a desired orientation.

Figure 24:
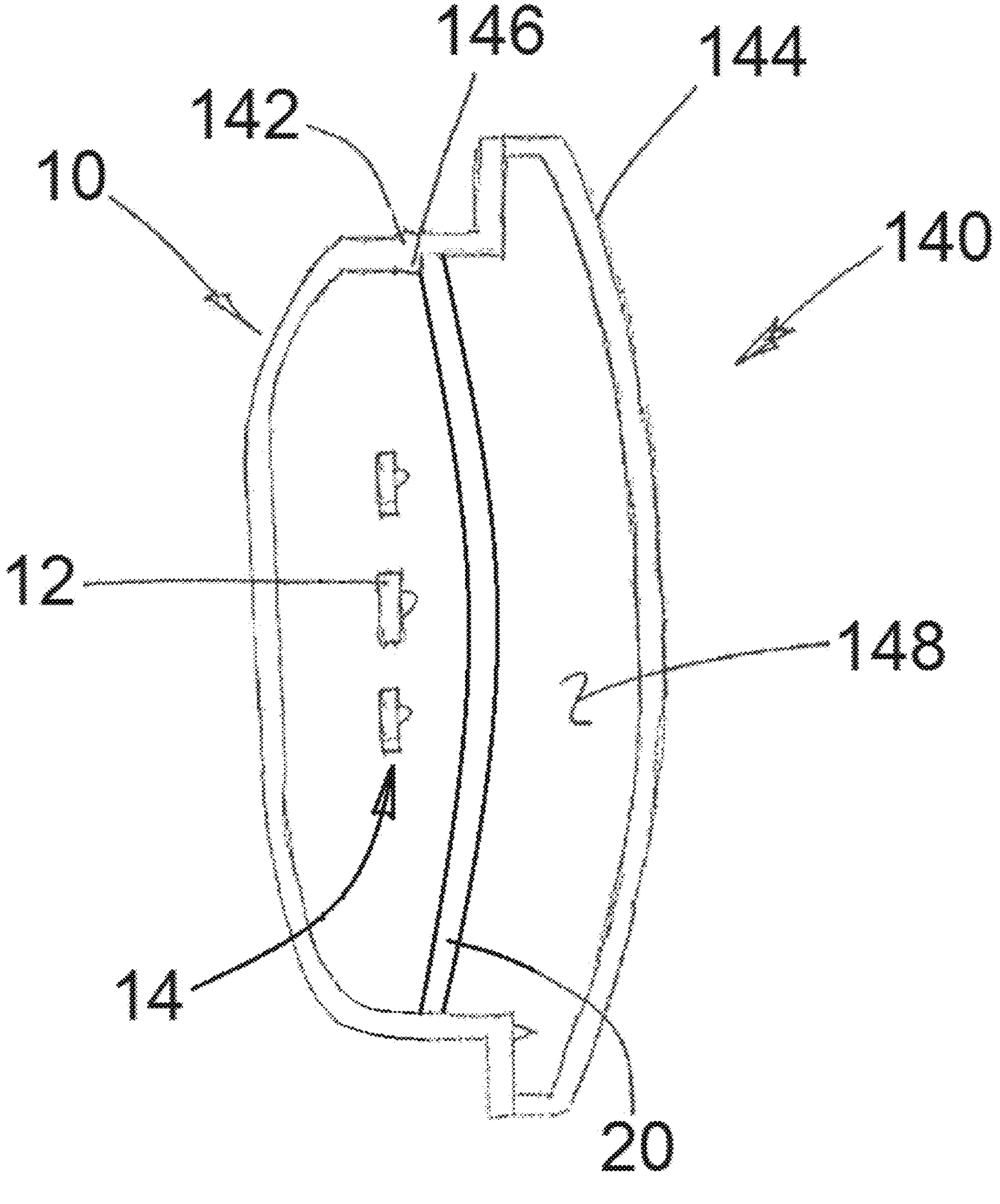
FIG. 24 shows a cross-sectional isometric view of an embodiment of a lamp assembly according to the present disclosure.

Such exemplary projection devices 10, as referenced above and shown in FIG. 20, may be incorporated into lamp assemblies 140 as shown in FIG. 24. Exemplary lamp assemblies 140 of the present disclosure may include an outer lens 144 attached to a housing 142 to form a volume 148 therebetween. The housing 142 and/or outer lens 144 may be structured to secure and position the projection device 10 within the volume 148. The housing 142 and/or outer lens 144 may be structured to establish and maintain the relative distance between the light source 12 (or array 14 of more than one light source 12) and curved first lens 20. In at least one embodiment, the housing 142 may include one or more bosses 146 structured to positively locate the first lens 20 and/or the second lens 22. In certain embodiments, curved first lens 20 may be attached to the housing 142 by any suitable means. For example, curved first lens 20 may be welded to the housing 142 using, without limitation, a sonic weld process, a vibration weld process, or thermal tack process. Alternatively or additionally, curved first lens 20 may be attached to the housing 142 using an adhesive. In at least one embodiment, the housing 142, outer lens 144, and/or curved first lens 20 may be configured to trap the curved first lens 20 in the desired position without an additional means of attachment.

Figure 25:
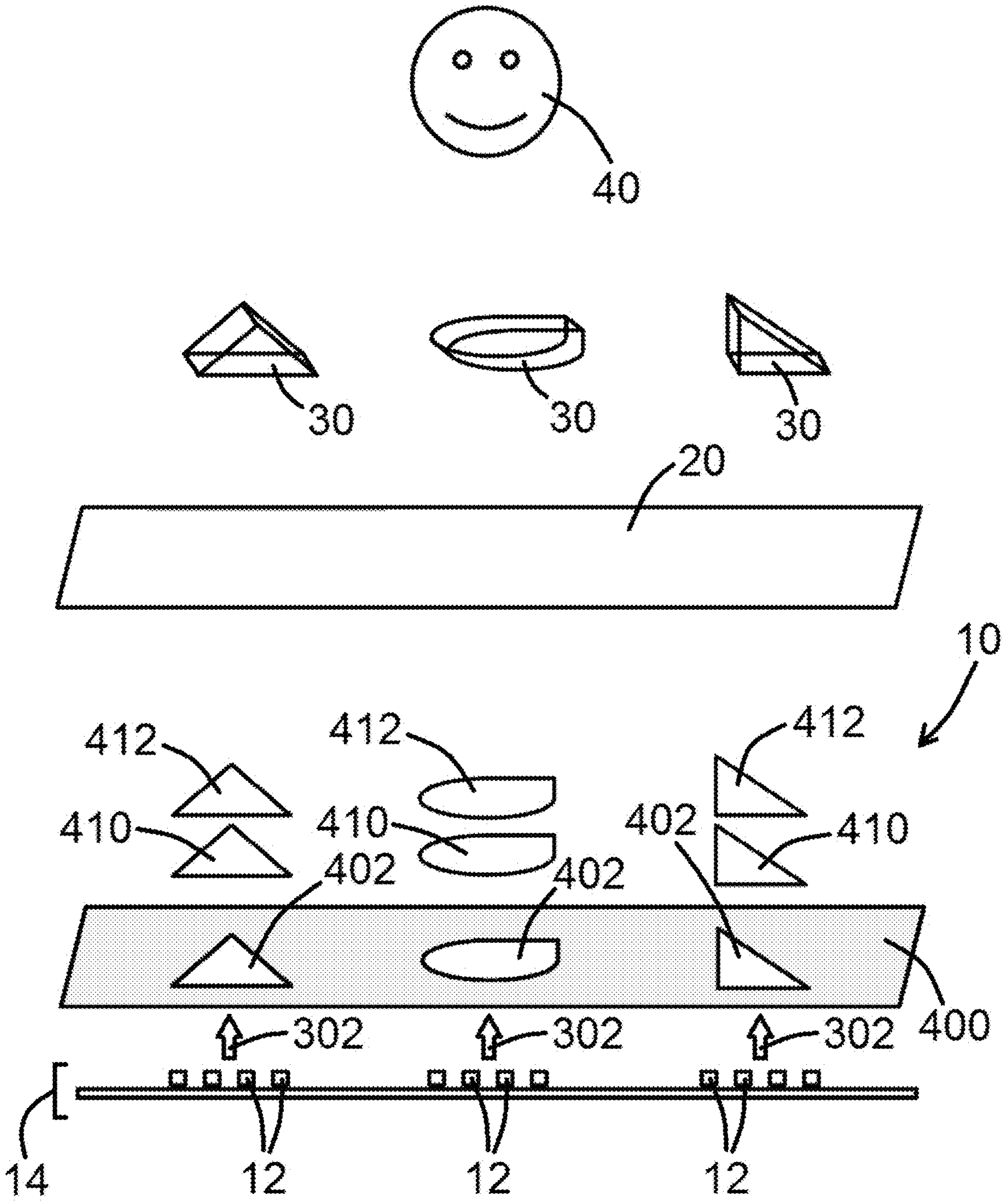
FIGS. 25, 26, 27, and 28 show projection devices having an opaque mask with custom apertures defined therethrough, according to the present disclosure.

Components of an exemplary projection device 10 of the present disclosure are shown in FIG. 25. As shown in FIG. 25, an exemplary projection device 10 comprises one or more light sources 12, which, in various embodiments, may be/comprise light emitting diodes (LEDs). Should a plurality of light sources 12 be used, such as a plurality of LEDs, said plurality of light sources 12 could comprise an array 14, as described in further detail herein. Light sources 12, as shown in FIG. 25, are configured/positioned so to direct light emitted therefrom (identified as light source light 302 in FIG. 25) toward an opaque mask 400, whereby opaque mask 400 has one or more custom apertures 402 defined therein/therethrough. In at least one embodiment, light source light 302 is directed toward opaque mask 400, through custom apertures 402, and toward custom lenticular shaped portions 410, 412 positioned adjacent to their corresponding custom apertures 402. Lenticular shaped portions 410, 412, as referenced herein, comprise lenticular lenses/sheets.

For example, and as shown in FIG. 25, first custom lenticular shaped portions 410 are positioned adjacent to their corresponding custom apertures 402 within opaque mask 400 distal to opaque mask 400, with distal meaning relatively away from light sources 12 (such that opaque mask 400 is proximal to first custom lenticular shaped portions 410, for example). Second custom lenticular shaped portions 412, as shown in FIG. 25, would then be positioned adjacent to their corresponding first custom lenticular shaped portions 410 distal to first custom lenticular shaped portions 410. Light source light 302, as shown in FIG. 25, would be directed toward opaque mask 400, through custom apertures 402, and through custom lenticular shaped portions 410, 412 positioned adjacent to their corresponding custom apertures 402, so that said light source light 302 would then be directed toward and through a first lenticular lens/sheet 20, 120. Once directed therethrough, the light source light 302 would form three-dimensional (3D) images 30, as shown in FIG. 25 for example, corresponding to the shapes of custom apertures 402 and custom lenticular shaped portions 410, 412. An observer 40, as shown in FIG. 25, could then view/see the three dimensional images 30 generated using such an exemplary projection device 10.

Use of the term "corresponding" referenced herein refers to, for example, the general shapes of custom apertures 402 and custom lenticular shaped portions 410, 412, such as shown in FIG. 25. For example, if a custom aperture 402 is sized and shaped as a triangle, corresponding custom lenticular shaped portions 410, 412 could also be sized and shaped as triangles, so to ultimately generate a three-dimensional image 400, as referenced in further detail herein, sized and shaped as a triangular three-dimensional image. Various sizes and shapes of custom apertures 402, and corresponding custom lenticular shaped portions 410, 412, could be used to generate various three-dimensional images 400 corresponding to said various shapes and sizes.

Figure 26:
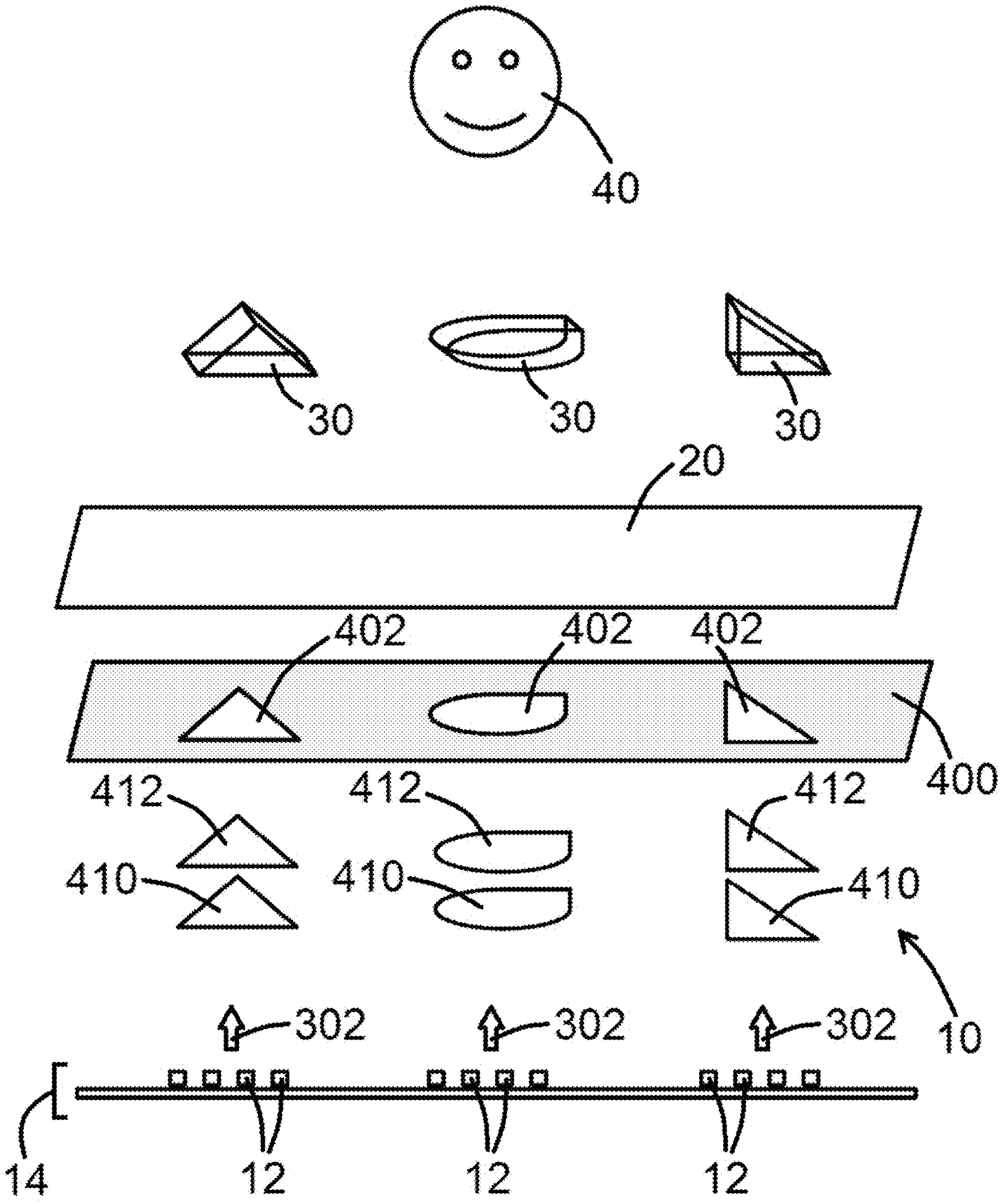

Components of another exemplary projection device 10 of the present disclosure are shown in FIG. 26. As shown in FIG. 26, an exemplary projection device 10 comprises one or more light sources 12, which, in various embodiments, may be/comprise light emitting diodes (LEDs). Should a plurality of light sources 12 be used, such as a plurality of LEDs, said plurality of light sources 12 could comprise an array 14, as described in further detail herein. Light sources 12, as shown in FIG. 26, are configured/positioned so to direct light emitted therefrom (identified as light source light 302 in FIG. 25) toward custom lenticular shaped portions 410, 412, positioned proximal to an opaque mask 400 having one or more custom apertures 402 defined therein/therethrough, whereby said custom apertures 402 are sized and shaped corresponding to the size(s) and/or shape(s) of custom lenticular shaped portions 410, 412. In at least one embodiment, light source light 302 is directed toward custom lenticular shaped portions 410, 412 positioned adjacent to their corresponding custom apertures 402, toward opaque mask 400, and through custom apertures 402.

For example, and as shown in FIG. 26, second custom lenticular shaped portions 412 are positioned adjacent to their corresponding custom apertures 402 within opaque mask 400 distal to opaque mask 400, with distal meaning relatively away from light sources 12 (such that opaque mask 400 is proximal to first custom lenticular shaped portions 410, for example). First custom lenticular shaped portions 410, as shown in FIG. 26, would then be positioned adjacent to their corresponding second custom lenticular shaped portions 412 proximal to second custom lenticular shaped portions 412. Light source light 302, as shown in FIG. 26, would be directed toward custom lenticular shaped portions 410, 412 positioned adjacent to their corresponding custom apertures 402, toward opaque mask 400, and through custom apertures 402, so that said light source light 302 would then be directed toward and through a first lenticular lens/sheet 20, 120. Once directed therethrough, the light source light 302 would form three-dimensional (3D) images 30, as shown in FIG. 26 for example, corresponding to the shapes of custom apertures 402 and custom lenticular shaped portions 410, 412. An observer 40, as shown in FIG. 26, could then view/see the three dimensional images 30 generated using such an exemplary projection device 10.

As noted above, first custom lenticular shaped portion 410 and second custom lenticular shaped portion 412 can be interchanged, so long as custom lenticular shaped portions 410, 412 are positioned relative to (next to) one another, as shown in FIGS. 25 and/or 26.

Opaque masks 400, as referenced herein, can be strategically situated (positioned) over a lit area, such as one generated by light sources 12 and/or arrays 14. The lit area may be a homogenous lit area so to generate optimal three-dimensional images 30 as referenced herein. Various three-dimensional images 30 can have various sizes and/or shapes, such as three-dimensional cube shapes, three-dimensional rectangular shapes, three-dimensional triangular shapes, three-dimensional cylindrical shapes, and/or other three-dimensional shapes, as may be desired. The generation of said three-dimensional images 30, as shown in FIGS. 25 and 26, include the use of a first lenticular lens/sheet 20, 120, and custom lenticular shaped portions 410, 412 positioned relative to an opaque mask 400. Said three-dimensional images 30, in various embodiments, can be "flipped" images, and can be made to increase or decrease in size and shape depending upon, for example, the size(s) and/or shape(s) of custom apertures 402 of opaque mask 400, the size(s) and/or shape(s) of custom lenticular shaped portions 410, 412, and/or the relative positioning of opaque mask 400, custom lenticular shaped portions 410, 412, and first lenticular lens/sheet 20, 120 relative to one another.

Figure 27:
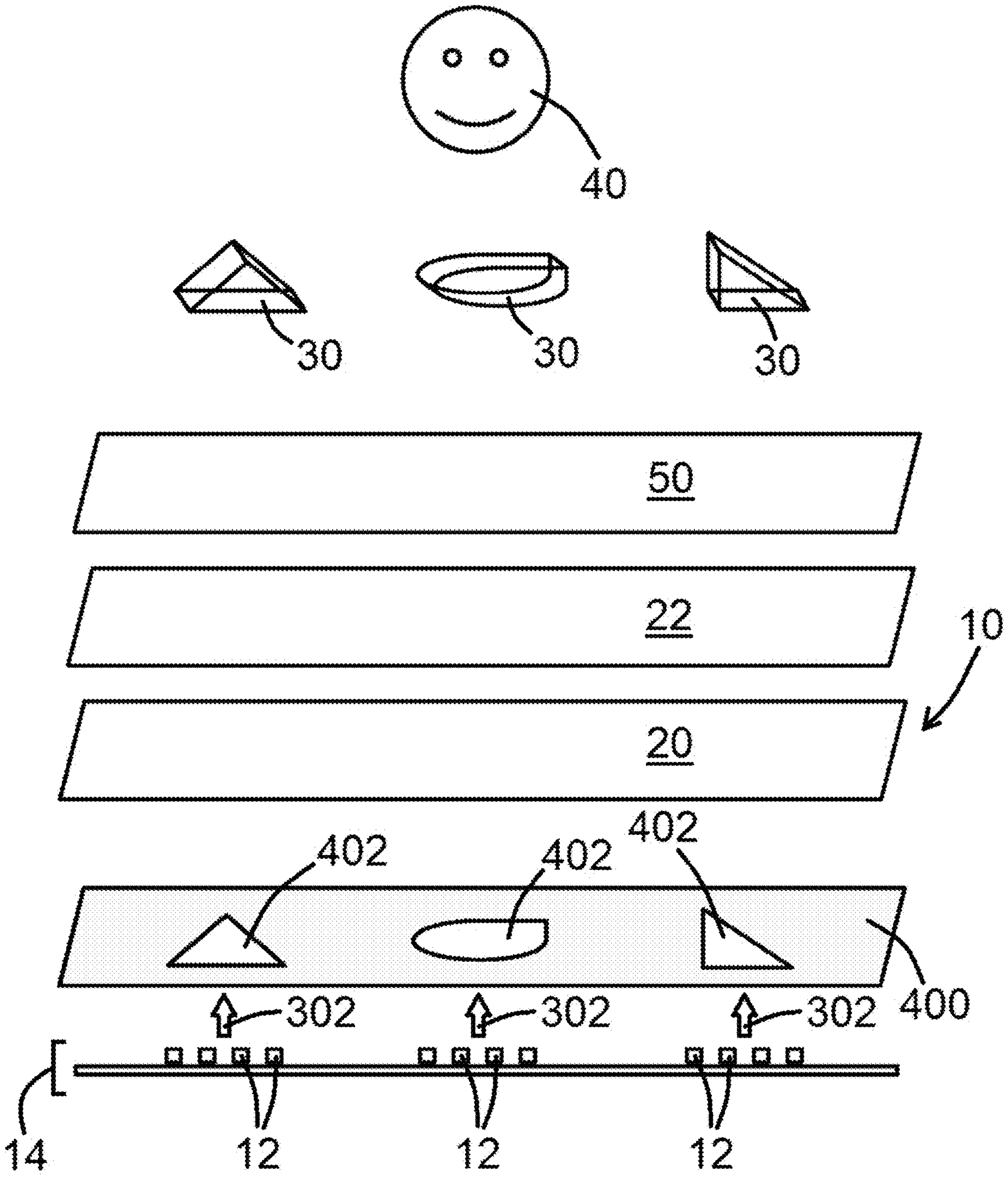

Components of another exemplary projection device 10 of the present disclosure are shown in FIG. 27. As shown in FIG. 27, an exemplary projection device 10 comprises one or more light sources 12, which, in various embodiments, may be/comprise light emitting diodes (LEDs). Light sources 12, as shown in FIG. 27, are configured/positioned so to direct light emitted therefrom (identified as light source light 302 in FIG. 27) toward an opaque mask 400, whereby opaque mask 400 has one or more custom apertures 402 defined therein/therethrough. In at least one embodiment, light source light 302 is directed toward opaque mask 400, through custom apertures 402, and instead of being further directed toward custom lenticular shaped portions 410, 412 positioned adjacent to their corresponding custom apertures 402, such as shown in FIG. 25, the light source light 302 is directed toward and through a first lenticular lens/sheet 20, 120, then to and through a second lenticular lens/sheet 22, and then to and through a third lenticular lens sheet 50, as shown in FIG. 27. Lenticular lenses/sheets 20 (or 120), 22, and 50, in such an embodiment, do not need to be sized and shaped corresponding to the size(s) and/or shape(s) of custom apertures 402, in order to generate the desired three-dimensional images 30 having size(s) and/or shape(s) generally corresponding to the size(s) and/or shape(s) of custom apertures 402. Lenticular lenses/sheets 20 (or 120), 22, and 50 would be positioned adjacent to one another, such as shown in FIG. 27, and by doing so the light source light 302 shining through custom apertures 402 of opaque mask 400 also shines through lenticular lenses/sheets 20 (or 120), 22, and 50 so to generate the desired three-dimensional images 30, viewable by an observer 40, for example.

Figure 28:
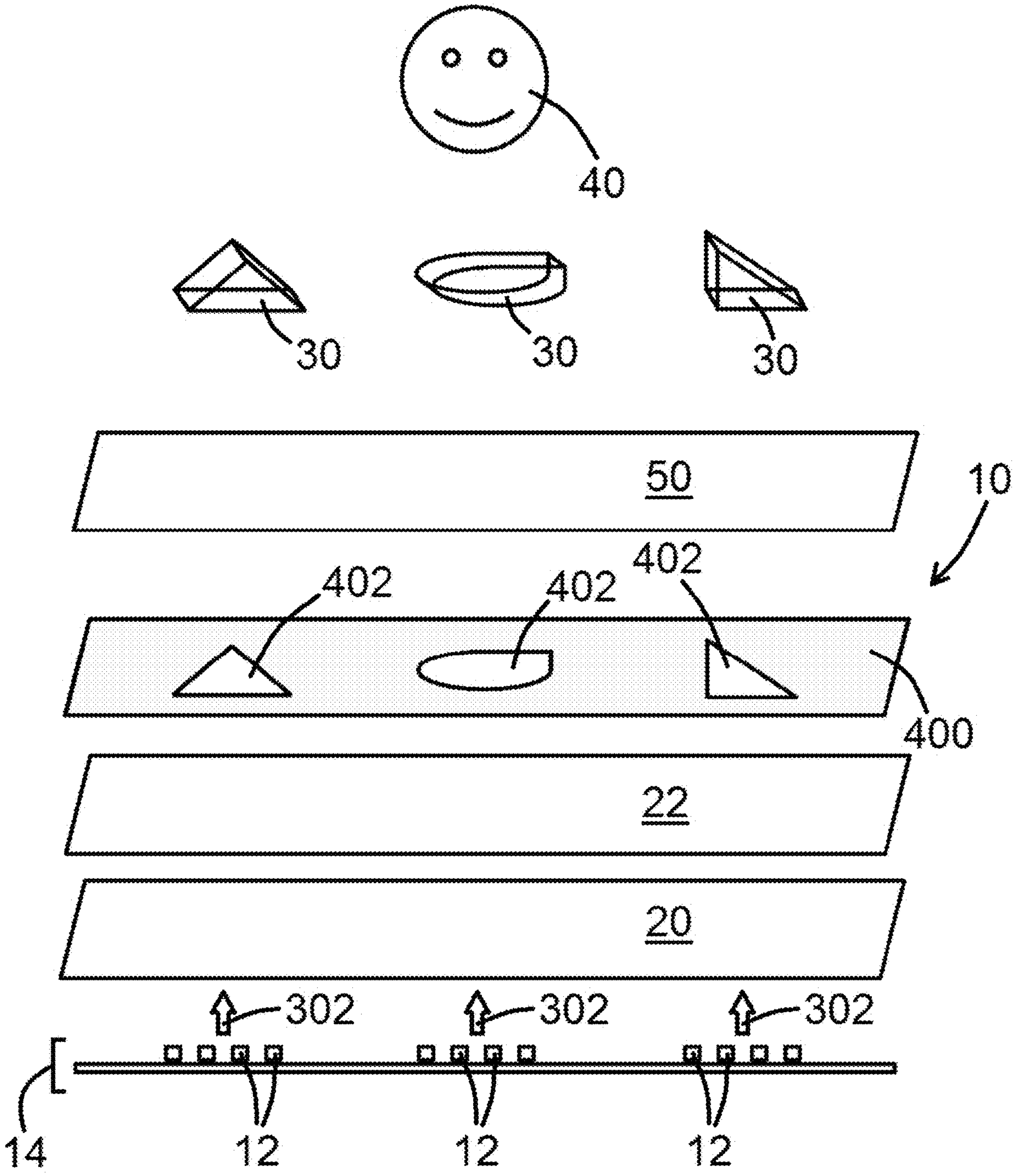

Components of another exemplary projection device 10 of the present disclosure are shown in FIG. 28. As shown in FIG. 28, an exemplary projection device 10 comprises one or more light sources 12, which, in various embodiments, may be/comprise light emitting diodes (LEDs). Light sources 12, as shown in FIG. 27, are configured/positioned so to direct light emitted therefrom (identified as light source light 302 in FIG. 27) is directed toward and through a first lenticular lens/sheet 20, 120, then to and through a second lenticular lens/sheet 22, and toward an opaque mask 400, whereby opaque mask 400 has one or more custom apertures 402 defined therein/therethrough. In at least one embodiment, light source light 302, after being directed to and through a first lenticular lens/sheet 20, 120 and to and through a second lenticular lens/sheet 22, is directed toward opaque mask 400, through custom apertures 402, and instead of being further directed toward custom lenticular shaped portions 410, 412 positioned adjacent to their corresponding custom apertures 402, such as shown in FIG. 25, the light source light 302 is directed toward and through a third lenticular lens sheet 50, as shown in FIG. 28. Lenticular lenses/sheets 20 (or 120), 22, and 50, in such an embodiment, do not need to be sized and shaped corresponding to the size(s) and/or shape(s) of custom apertures 402, in order to generate the desired three-dimensional images 30 having size(s) and/or shape(s) generally corresponding to the size(s) and/or shape(s) of custom apertures 402. Lenticular lenses/sheets 20 (or 120) and 22 would be positioned adjacent to one another, such as shown in FIG. 28, and by doing so the light source light 302 shining through first lenticular lens/sheet 20, 120, to and through a second lenticular lens/sheet 22, to an through custom apertures 402 of opaque mask 400, and to and through third lenticular lens/sheet 50, would generate the desired three-dimensional images 30, viewable by an observer 40, for example.

Figure 29:
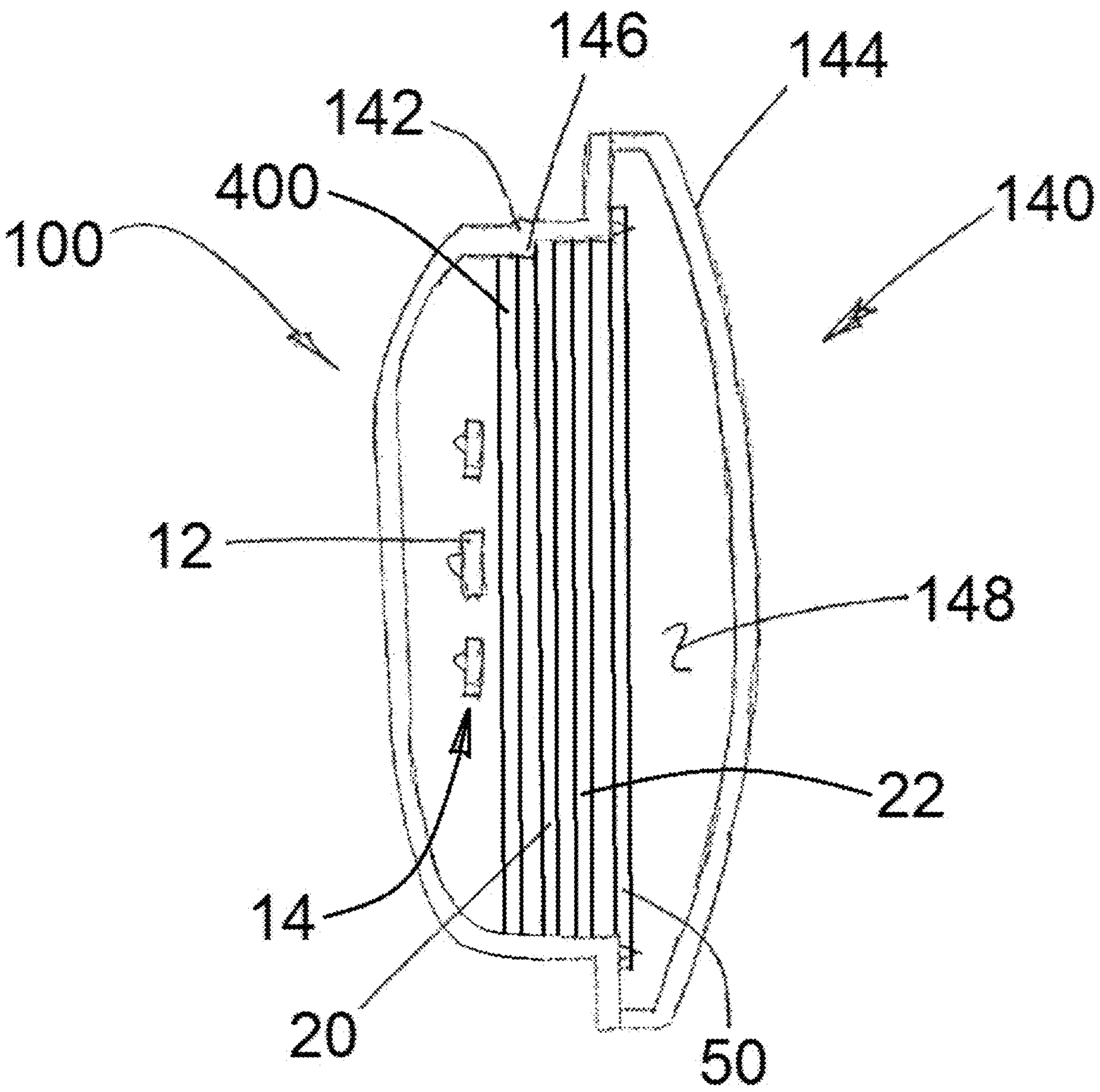
FIG. 29 shows a cross-sectional isometric view of an embodiment of a lamp assembly, according to the present disclosure.

Exemplary projection devices 10, as shown in FIGS. 25-28 for example, may be incorporated into lamp assemblies 140 as shown in FIG. 29. Exemplary lamp assemblies 140 of the present disclosure may include an outer lens 144 attached to a housing 142 to form a volume 148 therebetween. The housing 142 and/or outer lens 144 may be structured to secure and position the projection device 100 within the volume 148. The housing 142 and/or outer lens 144 may be structured to establish and maintain the relative distance between the light source 12 (or array 14 of more than one light source 12), and the various lenticular lenses/sheets 20 (or 120), 22, and 50, as well as opaque mask 400, in the various orders they are positioned relative to one another as shown in FIGS. 25-28. In at least one embodiment, the housing 142 may include one or more bosses 146 structured to positively locate one or more of lenticular lenses/sheets 20 (or 120), 22, and 50, and/or opaque mask 400. In certain embodiments, lenticular lenses/sheets 20 (or 120), 22, and 50, as well as opaque mask 400, may be attached to the housing 142 by any suitable means. For example, lenticular lenses/sheets 20 (or 120), 22, and 50, as well as opaque mask 400 may be welded to the housing 142 using, without limitation, a sonic weld process, a vibration weld process, or thermal tack process. Alternatively or additionally, lenticular lenses/sheets 20 (or 120), 22, and 50, as well as opaque mask 400, may be attached to the housing 142 using an adhesive. In at least one embodiment, the housing 142 and/or the outer lens 144 may be configured to trap lenticular lenses/sheets 20 (or 120), 22, and 50, and/or opaque mask 400 in their desired positions without an additional means of attachment. Lenticular lenses/sheets 20 (or 120), 22, and 50, and opaque mask 400 may be positioned relative to one another, such as shown in FIGS. 25-28, within housing 142 as may be desired, and the order shown in FIG. 29 is not the only order that is encompassed within the present disclosure.

It is further noted that at least one of lenticular lenses/sheets 20 (or 120), 22, and 50, and/or opaque mask 400 and/or custom lenticular shaped portions 410, 412 may be physically coupled to opaque mask 400, and not positioned a distance relative thereto, as may be desired. For example, at least one of lenticular lenses/sheets 20 (or 120), 22, and 50, and/or opaque mask 400 and/or custom lenticular shaped portions 410, 412 may be snapped, glued, heat staked, or sonic welded into place within housing 142 and/or directly to opaque mask 400, over custom apertures 402, as may be desired. In the various embodiments referenced in FIGS. 25-29, the first two lenticular lenses/sheets of 20 (or 120), 22, and/or 50 would form a homogenous shape corresponding to custom apertures 402 of opaque mask 400, and the third lenticular lens/sheet of 20 (or 120), 22, or 50 would ultimately generate the three-dimensional image 30 from said homogenous shape, for example.

Figure 30A:
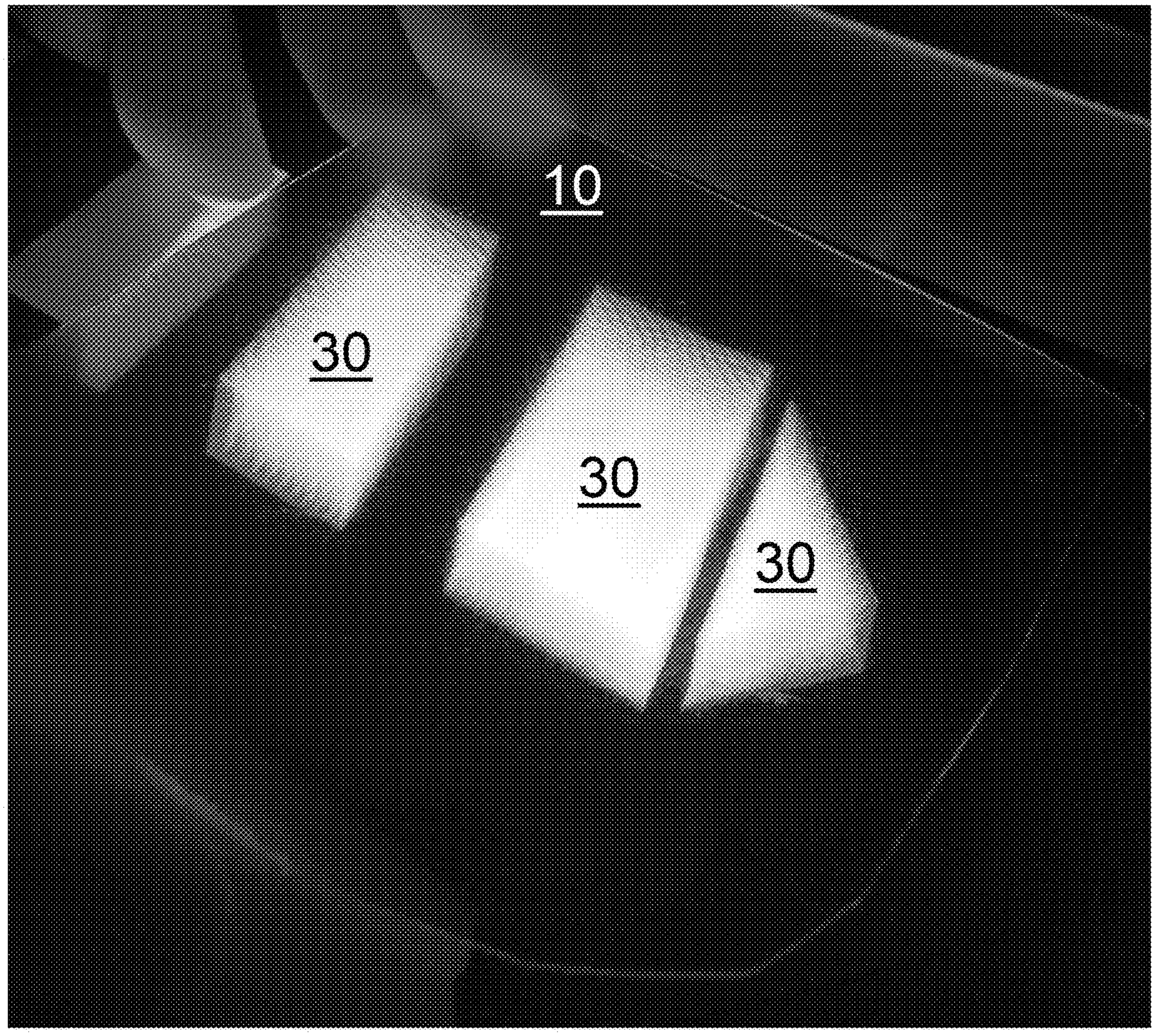
FIGS. 30A and 30B show photographs of portions of projection device operated to generate three-dimensional images, according to the present disclosure.
Figure 30B:
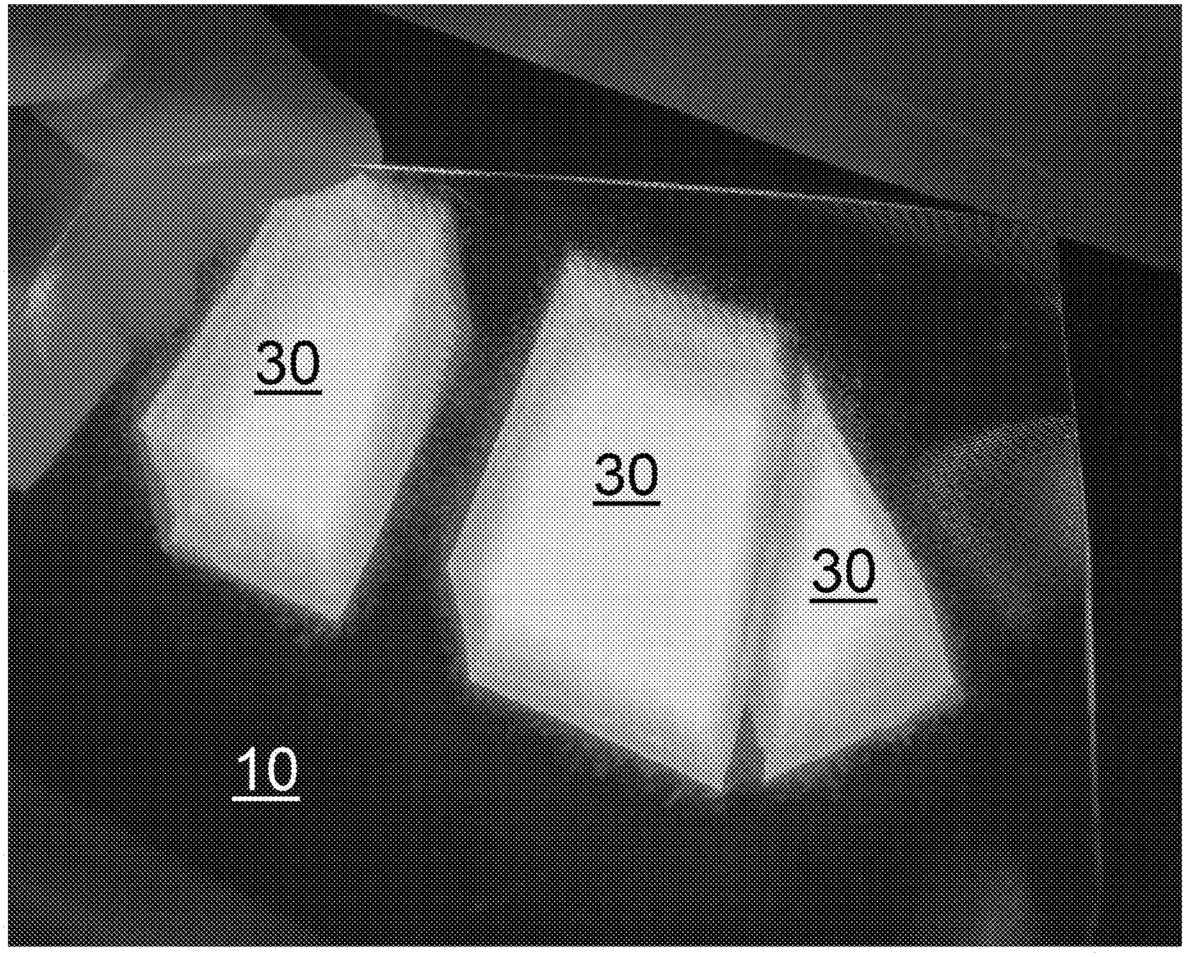

FIGS. 30A and 30B show photographs of portions of exemplary projection devices 100 of the present disclosure, whereby three-dimensional images 30 are shown, generated by way of light source light 302 from a light source 12 (or an array 14 of light sources 12), and through lenticular lenses/sheets 20 (or 120), 22, and 50, and custom apertures 402 opaque mask 400, as referenced in FIGS. 25-29 herein. Said three-dimensional images 30 generally correspond to size(s) and/or shape(s) of custom apertures 402 of opaque mask 400.

Figure 31:
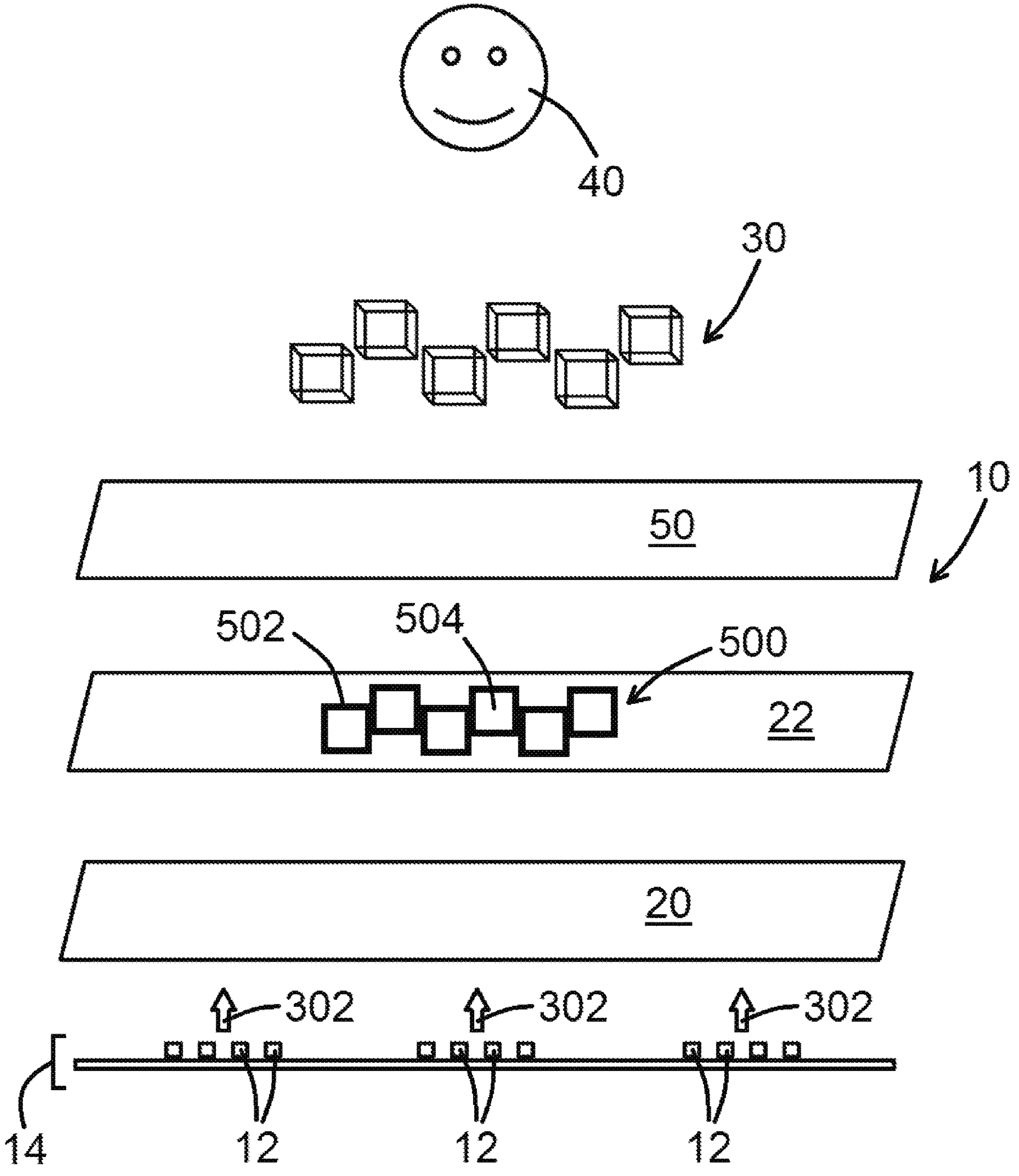
FIG. 31 shows a projection device having a negative image mask, according to the present disclosure.

FIG. 31 shows components of another exemplary projection device 10 of the present disclosure. As shown in FIG. 31, an exemplary projection device 10 comprises one or more light sources 12, which, in various embodiments, may be/comprise light emitting diodes (LEDs). Light sources 12, as shown in FIG. 31, are configured/positioned so to direct light emitted therefrom (identified as light source light 302 in FIG. 31) toward and through a first lenticular lens/sheet 20, 120, then to and through a second lenticular lens/sheet 22, and then to and through a third lenticular lens sheet 50. A negative image mask 500, such as shown in FIG. 31, can be positioned upon, placed upon, written upon, painted upon, embedded within, etc., second lenticular lens/sheet 22, whereby light source light 302 cannot pass through negative image mask 500 itself (due to its opacity). In at least one embodiment of the present disclosure, light source light 302 is directed to and through a first lenticular lens/sheet 20, 120, then to and through a second lenticular lens/sheet 22, whereby portions of light source light 302 are effectively blocked by negative image mask 500, and then to and through a third lenticular lens sheet 50, noting that the light source light 302 that is not blocked by negative image mask 500 can generate the desired three-dimensional images 30 generally corresponding to the size(s) and/or shape(s) of negative image mask 500.

For example, and as shown in FIG. 31, negative image mask 500 can comprise square shape(s). Other shapes, such as round shapes, triangular shapes, rectangular shapes, and/or other shapes, can be used alone or in combination with one another, as one or more negative image masks 500 of the present disclosure. Negative image masks 500 of the present disclosure comprise an opaque portion 502 and one or more open portions 504, whereby said open portions are partially or fully defined by opaque portions 502, such as when an opaque portion 502 forms a square, a circle, a triangle, etc., or portions thereof. The three-dimensional image(s) 30 generated using such an exemplary projection device of the present disclosure would therefore be effective negatives of negative image masks 500, as the three-dimensional image(s) 30, at least in part, are formed by the light source light 302 passing through one or more open portions 504 of negative image masks 500. The three-dimensional image(s) 30 can then be viewed by an observer 40, for example, as shown in FIG. 31.

Figure 32:
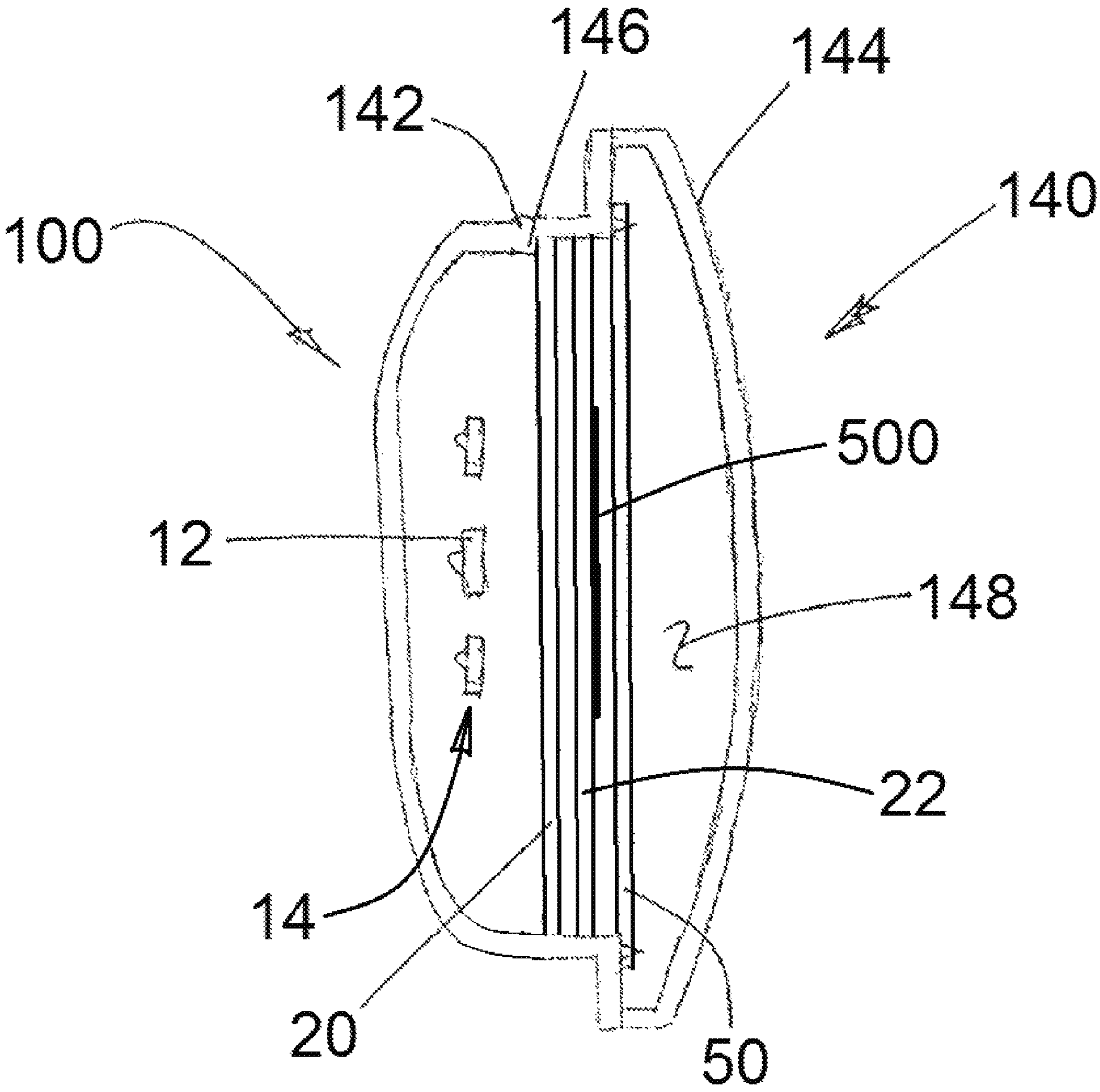
FIG. 32 shows a cross-sectional isometric view of an embodiment of a lamp assembly, according to the present disclosure.

Exemplary projection devices 10, as shown in FIG. 31 for example, may be incorporated into lamp assemblies 140 as shown in FIG. 32. Exemplary lamp assemblies 140 of the present disclosure may include an outer lens 144 attached to a housing 142 to form a volume 148 therebetween. The housing 142 and/or outer lens 144 may be structured to secure and position the projection device 100 within the volume 148. The housing 142 and/or outer lens 144 may be structured to establish and maintain the relative distance between the light source 12 (or array 14 of more than one light source 12), and the various lenticular lenses/sheets 20 (or 120), 22, and 50, as well as negative image mask 500, as positioned relative to one another as shown in FIG. 31. In at least one embodiment, the housing 142 may include one or more bosses 146 structured to positively locate one or more of lenticular lenses/sheets 20 (or 120), 22, and/or 50. In certain embodiments, lenticular lenses/sheets 20 (or 120), 22, and/or 50, may be attached to the housing 142 by any suitable means. For example, lenticular lenses/sheets 20 (or 120), 22, and/or 50, may be welded to the housing 142 using, without limitation, a sonic weld process, a vibration weld process, or thermal tack process. Alternatively or additionally, lenticular lenses/sheets 20 (or 120), 22, and/or 50, may be attached to the housing 142 using an adhesive. In at least one embodiment, the housing 142 and the outer lens 144 may be configured to trap lenticular lenses/sheets 20 (or 120), 22, and/or 50 in their desired positions without an additional means of attachment.

Figure 33:
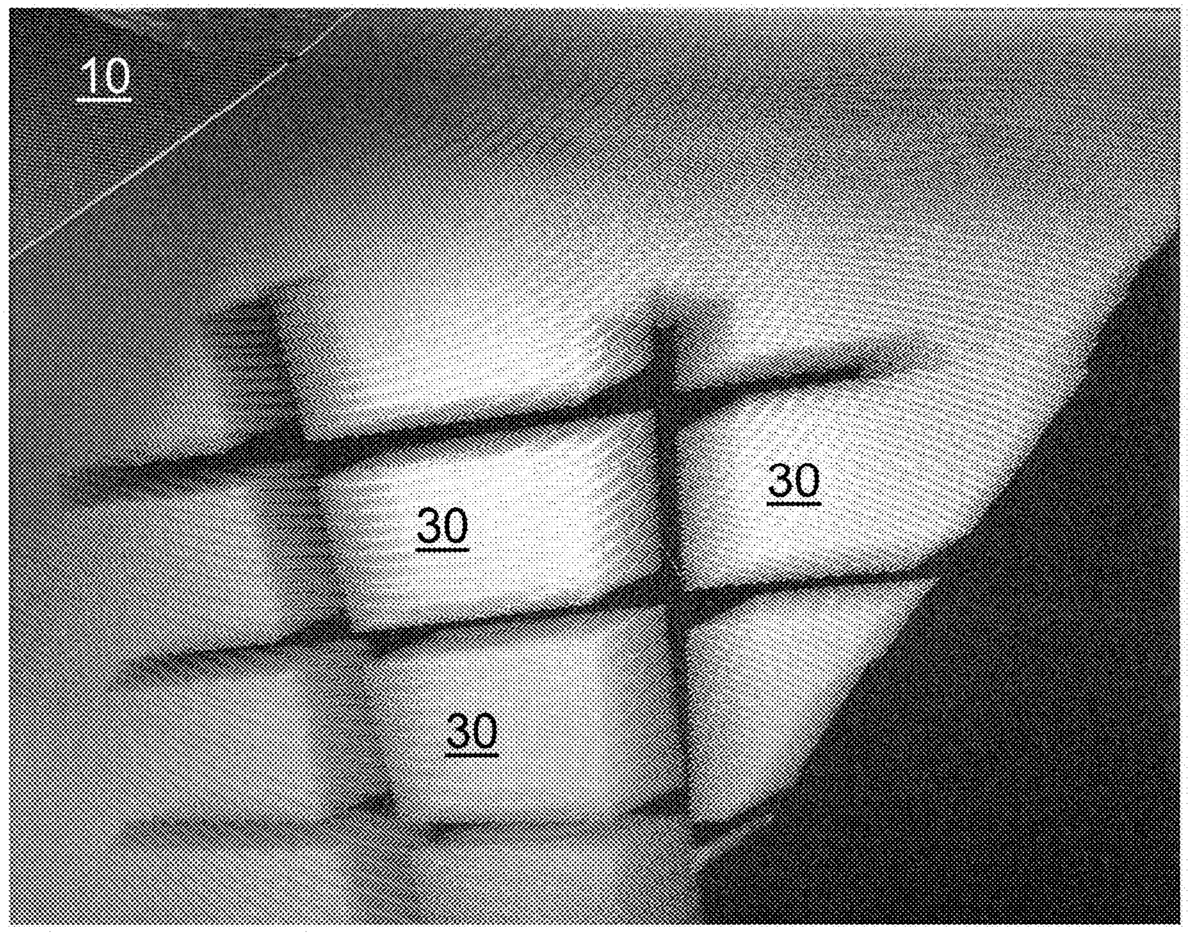
FIG. 33 shows a photograph of portions of projection device operated to generate three-dimensional images, according to the present disclosure.

FIG. 33 shows a photographs of portions of an exemplary projection device 100 of the present disclosure, whereby three-dimensional images 30 are shown, generated by way of light source light 302 from a light source 12 (or an array 14 of light sources 12), and through lenticular lenses/sheets 20 (or 120), 22, and 50, and through negative image mask 500, as referenced in FIG. 31 herein. Said three-dimensional images 30 generally correspond to size(s) and/or shape(s) of open portions 502 of negative image mask 500.

While various embodiments of projection devices and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A projection device, comprising:

a light source;

an opaque mask having one or more custom apertures defined therethrough, each of the one or more custom apertures having a size and a shape;

at least one first lens element and at least one second lens element; and a lenticular lens/sheet;

wherein the projection device is configured to generate one or more three dimensional images corresponding to the one or more custom apertures of the opaque mask by emitting light from the light source and through the one or more custom apertures of the opaque mask, the at least one first lens element, the at least one second lens element, and the lenticular lens/sheet.

2. The projection device of claim 1, wherein the light source comprises one or more light-emitting diodes.

3. The projection device of claim 1, wherein the at least one first lens element comprises at least one first custom lenticular shaped portion, and wherein the at least one second lens element comprises at least one second custom lenticular shaped portion.

4. The projection device of claim 3, wherein the at least one first custom lenticular shaped portion and the at least one second custom lenticular shaped portion have a size and a shape corresponding to the size and the shape of the one or more custom apertures.

5. The projection device of claim 1, wherein the at least one first lens element comprises at least one additional lenticular lens/sheet, and wherein the at least one second lens element comprises at least one further lenticular lens/sheet.

6. The projection device of claim 1, forming part of a lamp assembly, the lamp assembly further comprising a housing and an outer lens, wherein the projection device is positioned within the housing.

7. The projection device of claim 6, wherein the lamp assembly is configured as a vehicle lamp assembly.

8. The projection device of claim 1, forming part of a lamp assembly, the lamp assembly further comprising:

a housing; and an outer lens coupled to the housing to define a volume, wherein the projection device is positioned within the volume.

9. A projection device, comprising:

a light source;

a first lenticular lens/sheet;

a second lenticular lens/sheet positioned distal to the first lenticular lens/sheet relative to the light source, the second lenticular lens/sheet having a negative image mask thereon or defined therein, the negative image mask having one or more opaque portions defining one or more open portions; and a third lenticular lens/sheet positioned distal to the second lenticular lens/sheet;

wherein the projection device is configured to generate one or more three dimensional images corresponding to the one or more open portions of the negative image mask by emitting light from the light source and through the first lenticular lens/sheet, the negative image mask of the second lenticular lens/sheet, and the third lenticular lens/sheet.

10. The device of claim 9, wherein the light source comprises one or more light-emitting diodes.

11. The device of claim 9, forming part of a lamp assembly, the lamp assembly further comprising a housing and an outer lens, wherein the projection device is positioned within the housing.

12. The device of claim 11, wherein the lamp assembly is configured as a vehicle lamp assembly.

13. The projection device of claim 9, forming part of a lamp assembly, the lamp assembly further comprising:

a housing; and an outer lens coupled to the housing to define a volume, wherein the projection device is positioned within the volume.

* * * * *